United States Patent
Roy

(10) Patent No.: US 11,079,753 B1
(45) Date of Patent: Aug. 3, 2021

(54) SELF-DRIVING VEHICLE WITH REMOTE USER SUPERVISION AND TEMPORARY OVERRIDE

(71) Applicant: Matthew Roy, Ottawa (CA)

(72) Inventor: Matthew Roy, Ottawa (CA)

( * ) Notice: Subject to any disclaimer, the term of this patent is extended or adjusted under 35 U.S.C. 154(b) by 269 days.

(21) Appl. No.: 16/241,873

(22) Filed: Jan. 7, 2019

Related U.S. Application Data

(60) Provisional application No. 62/614,475, filed on Jan. 7, 2018.

(51) Int. Cl.
*G05D 1/00* (2006.01)
*G05D 1/02* (2020.01)

(52) U.S. Cl.
CPC ......... *G05D 1/0038* (2013.01); *G05D 1/0044* (2013.01); *G05D 1/0088* (2013.01); *G05D 1/028* (2013.01); *G05D 1/0278* (2013.01); *G05D 2201/0213* (2013.01)

(58) Field of Classification Search
CPC .. G05D 1/0038; G05D 1/0278; G05D 1/0088; G05D 1/0044; G05D 1/028; G05D 2201/0213; G05D 1/0011–005
See application file for complete search history.

(56) References Cited

U.S. PATENT DOCUMENTS

| | | | | |
|---|---|---|---|---|
| 5,611,060 A | * | 3/1997 | Belfiore | G06F 3/0485 715/819 |
| 9,568,995 B1 | * | 2/2017 | Lian | G06T 15/20 |
| 10,019,054 B2 | * | 7/2018 | Lian | G06F 3/012 |
| 10,328,897 B1 | * | 6/2019 | Nabbe | G06F 21/305 |
| 2005/0264527 A1 | * | 12/2005 | Lin | G06F 3/011 345/156 |
| 2006/0036643 A1 | * | 2/2006 | Tsuboi | G01C 21/362 |
| 2008/0114538 A1 | * | 5/2008 | Lindroos | G01C 22/00 701/433 |
| 2013/0253826 A1 | * | 9/2013 | Tava | G01C 21/3492 701/527 |
| 2015/0120089 A1 | * | 4/2015 | Peel | B60T 7/02 701/2 |
| 2016/0252903 A1 | * | 9/2016 | Prokhorov | B60W 40/02 701/23 |
| 2017/0090589 A1 | * | 3/2017 | Sharma | G06F 9/541 |
| 2017/0160738 A1 | * | 6/2017 | Ganz | G05D 1/0022 |

(Continued)

*Primary Examiner* — Genna M Mott

(57) ABSTRACT

A vehicle self-driving vehicle system comprises a self-driving vehicle and a remotely situated vehicle control device in data communication with vehicle and operable by a user situated outside of the vehicle. The vehicle comprises sensors and a processor configured to generate steering, acceleration and braking control signals. The vehicle has a GNSS receiver for determining a location of vehicle, a radiofrequency data transceiver, and a first-person view (FPV) camera for generating FPV images transmitted to the remotely situated vehicle control device. The processor is further configured to receive supplemental vehicle control input from the remotely situated vehicle control device, and wherein the processor is further configured to modify the steering, acceleration and braking control signals based on the supplemental vehicle control input. The remotely situated vehicle control device displays FPV images and receives the supplemental vehicle control input, and transmits the supplemental vehicle control input data to the self-driving vehicle.

20 Claims, 22 Drawing Sheets

(56) References Cited

U.S. PATENT DOCUMENTS

| | | | |
|---|---|---|---|
| 2017/0192497 A1* | 7/2017 | Lian | G06F 3/011 |
| 2017/0347002 A1* | 11/2017 | Baker | G06K 9/00832 |
| 2018/0126986 A1* | 5/2018 | Kim | B60W 50/087 |
| 2019/0017863 A1* | 1/2019 | Saltzman | G07F 7/06 |

* cited by examiner

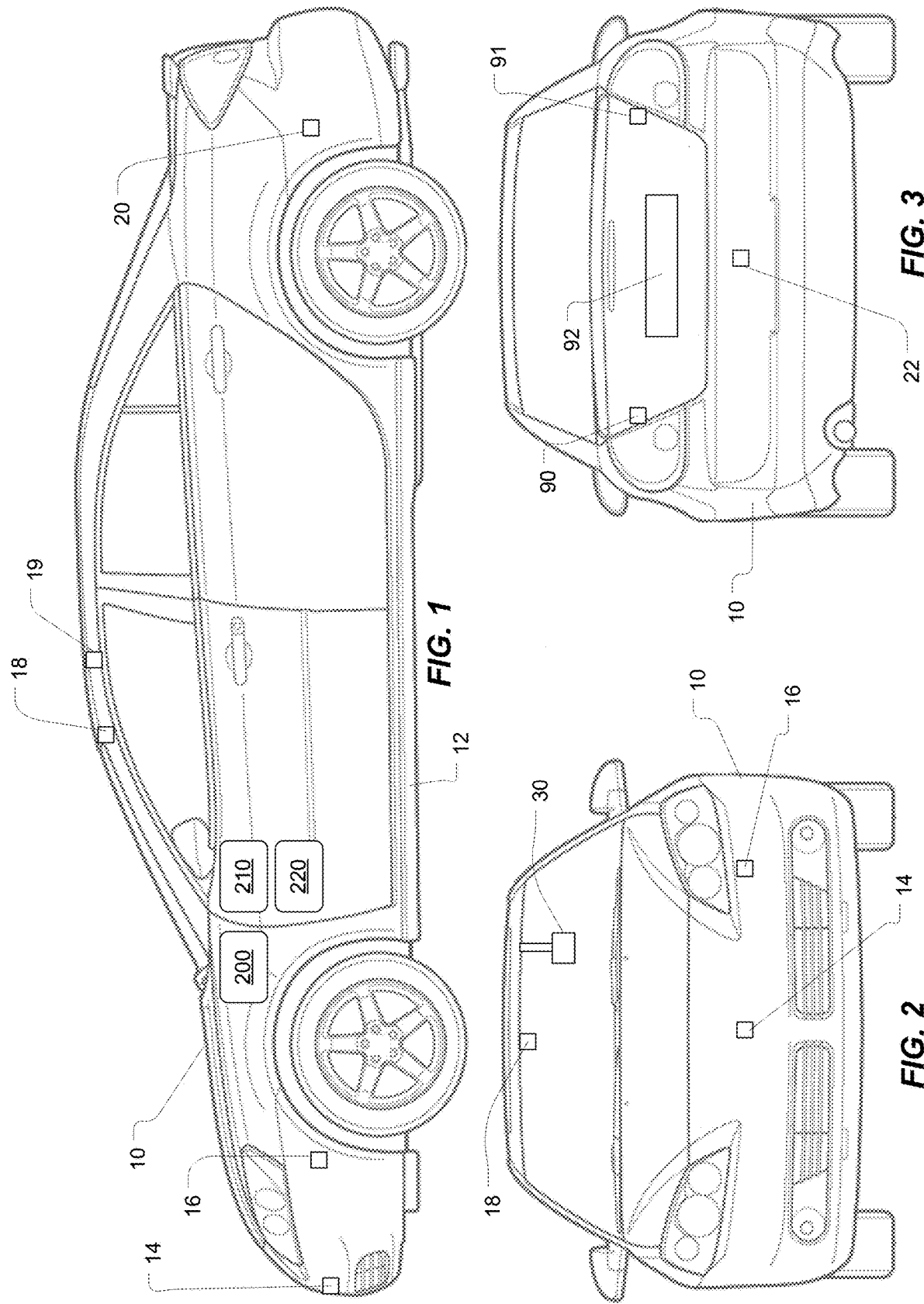

SELF-DRIVING VEHICLE WITH REMOTE USER SUPERVISION AND TEMPORARY OVERRIDE

CROSS-REFERENCE TO RELATED APPLICATIONS

This application claims priority from U.S. 62/614,475 which is hereby incorporated by reference.

TECHNICAL FIELD

The present invention relates generally to vehicles and, in particular, to autonomous or self-driving vehicles.

BACKGROUND

Autonomous or self-driving vehicles use sensors such as RADAR, LIDAR and/or cameras to provide signals to a processor or controller that generates and outputs steering, acceleration and braking signals to the vehicle. A Global Navigation Satellite System (GNSS) receiver such as a Global Positioning System (GPS) receiver is also used for navigation. Self-driving vehicles mostly operate only when a human driver is seated in the driver's seat in order to override the autonomous system in the event of a failure or anomaly. With rapid advances in self-driving vehicles, it is predicted that shortly unmanned autonomous vehicles will increasingly operate without any human driver sitting in the driver's seat of the vehicle. Many example use cases for self-driving cars come to mind: taxis, limousines, delivery vehicles, buses, trucks, vans, ambulances, and cars. Self-driving vehicles can be used to pick up or drop off its owner. Self-driving cars can be sent to pick up children, groceries, items from stores, friends or family members. In addition, unmanned self-driving vehicles can be tractors, combines, harvesters or other farm or self-powered agricultural equipment, mining vehicles, tanks, armoured personnel carriers or other military vehicles. It will be appreciated that various types of recreational, utility and construction vehicles may also be unmanned autonomous vehicles.

A recurring concern with self-driving vehicles is the risk of computer malfunction or sensor malfunction. Another recurring concern is the risk of the vehicle being hacked or infected with malware and/or remotely hijacked, stolen, intentionally crashed or used for criminal or terrorist acts. In each of these instances, there is an underlying concern that the self-driving vehicle when operating without a human onboard can no longer be controlled by its rightful owner and/or by police or law enforcement agents in the event of malfunction or malfeasance.

Innovations and improvements relating to autonomous vehicles to address one or more of the above issues are thus highly desirable.

SUMMARY

In general, the present invention provides a self-driving vehicle system that includes a self-driving vehicle that is selectively remotely controlled by a remote user. The system thus includes the vehicle and a remotely situated vehicle control device in data communication with the self-driving vehicle and operable by a user situated outside of the vehicle. The remotely situated vehicle control device receives first-person view (FPV) images from a FPV camera on the vehicle. The remotely situated vehicle control device enables the user to remotely control the vehicle within certain predetermined parameters, thereby enabling safe remote operation of the vehicle.

An inventive aspect of the present disclosure is self-driving vehicle system comprising a self-driving vehicle and a remotely situated vehicle control device in data communication with the self-driving vehicle and operable by a user situated outside of the vehicle. The self-driving vehicle comprises a vehicle chassis, a motor supported by the chassis for providing propulsive power for the vehicle, a braking system, a steering system, a plurality of sensors, a processor configured to receive signals from the sensors and to generate steering, acceleration and braking control signals for controlling the steering system, the motor and the braking system of the vehicle, a Global Navigation Satellite System (GNSS) receiver for receiving satellite signals and for determining a current location of the self-driving vehicle, and a radiofrequency data transceiver. The vehicle also includes a first-person view (FPV) camera for generating FPV images that are transmitted as FPV data in real-time via the radiofrequency data transceiver to a remotely situated vehicle control device, wherein the processor is further configured to receive supplemental vehicle control input from the remotely situated vehicle control device, and wherein the processor is further configured to modify the steering, acceleration and braking control signals based on the supplemental vehicle control input. The remotely situated vehicle control device comprises a device data transceiver for receiving the FPV data, a device processor for processing the FPV and for regenerating the FPV images, a device display cooperating with the device processor to display the FPV images, a user input device configured to receive the supplemental vehicle control input. The device processor is configured to generate supplemental vehicle control input data and to cooperate with the device data transceiver to transmit the supplemental vehicle control input data to the self-driving vehicle.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which:

FIG. 1 is a side view of an autonomous ("self-driving") vehicle in accordance with an embodiment of the present invention.

FIG. 2 is a front view of the vehicle of FIG. 1.

FIG. 3 is a rear view of the vehicle of FIG. 1.

It will be noted that throughout the appended drawings, like features are identified by like reference numerals.

DETAILED DESCRIPTION

Figure 4:
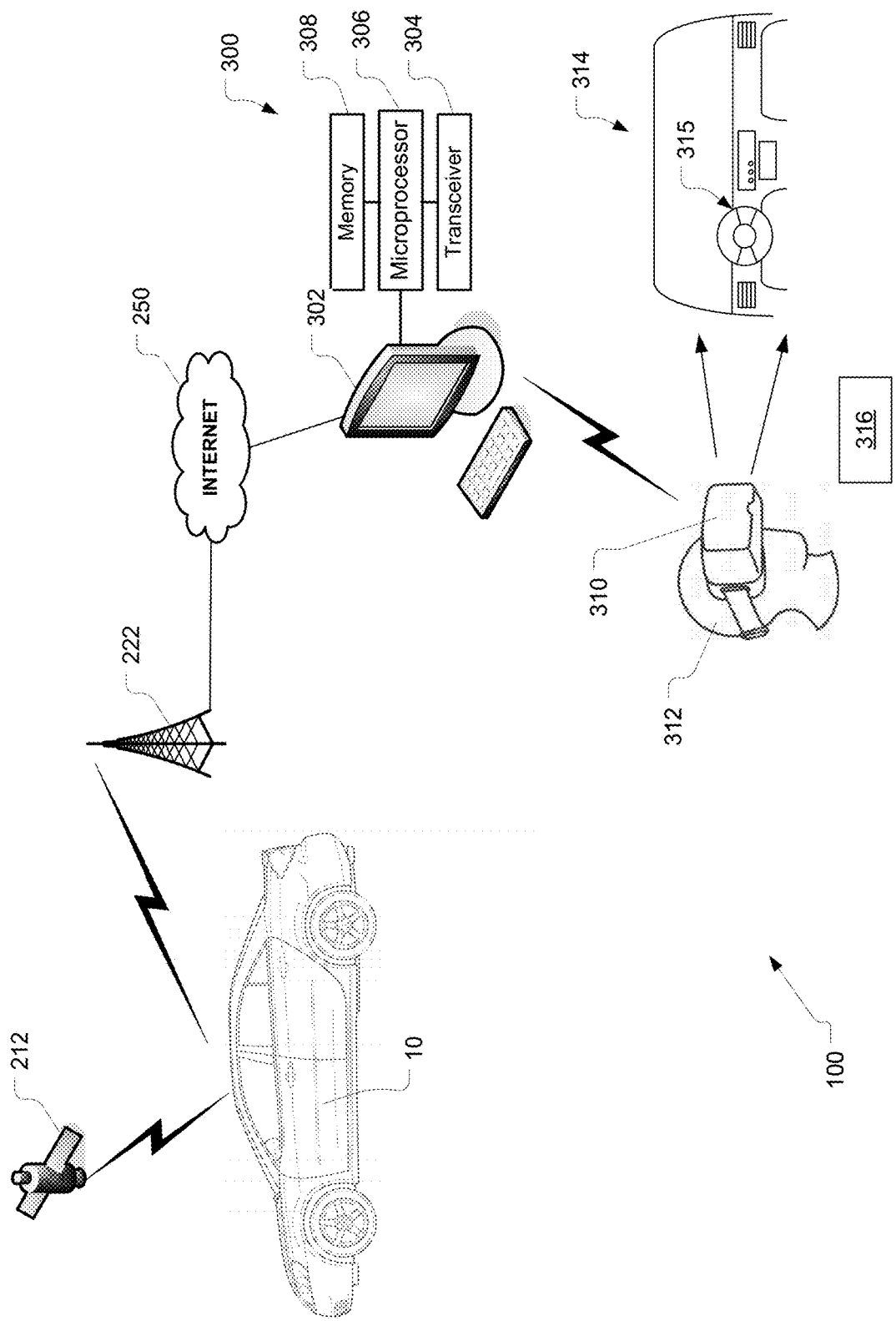
FIG. 4 is a schematic depiction of a self-driving vehicle system having a VR/AR/FPV headset for remotely supervising and controlling the vehicle in accordance with an embodiment of the present invention.

Disclosed herein are various embodiments of a hybrid remotely controlled and self-driving vehicle system (HRCSDV) that includes a self-driving vehicle that is selectively remotely controlled by a remote user. The HRCSDV system includes the vehicle and a remotely situated vehicle control device in data communication with the self-driving vehicle and operable by a user situated outside of the vehicle. The remotely situated vehicle control device receives video images, e.g. first-person view (FPV) images, from one or more generally forward-facing cameras, e.g. a FPV camera or multiple FPV cameras, on or in the vehicle.

The remotely situated vehicle control device enables the user, who is situated outside of the vehicle, to remotely control the vehicle within certain predetermined parameters, thereby enabling safe remote operation of the vehicle. In most instances, the user is not within line of sight of the vehicle. As such, the remote control of the vehicle is beyond line of sight. The beyond light of sight (BLOS) control enables supervision and overriding of the self-driving algorithm operating the vehicle.

For the purposes of this specification, the term "self-driving vehicle" is meant to encompass any land-based vehicle such as a car, van, minivan, sports utility vehicle (SUV), crossover-type vehicle, bus, minibus, truck, tractor-trailer, semi-trailer, construction vehicle, work vehicle, tracked vehicle, semi-tracked vehicle, offroad vehicle, electric cart, dune buggy, or the like. The terms "autonomous" and "self-driving" in relation to "vehicle" are meant to encompass any vehicle having environment-detecting sensors and a processor, controller, computer, computing device or computer system for autonomously steering, accelerating and braking the vehicle, i.e. self-driving or driving autonomously, without a driver physically touching, interacting with or providing input to the steering wheel, accelerator pedal and brake pedal. For the purposes of this specification, the expression "self-driving vehicle" (or autonomous vehicle) refers to a self-drivable vehicle that is capable of operating in two modes: a first mode that is purely self-driving in which the vehicle operates autonomously (i.e. a self-driving mode or autonomous mode) and a second mode (remote controlled mode) in which the vehicle is remotely controlled, in whole or in part, by the remote control device operated by a remotely situated user, i.e. a user who is not traveling inside the vehicle that is being controlled. Partial remote control, as will become apparent from the description below, means that the vehicle is operating semi-autonomously, using both its onboard sensors and processor to provide driving signals, but also receiving input from the remote control device that modifies or adjusts the autonomous driving signals to thus provide a blended or mixed control scheme. In this sense, the remote user can merely passively observe or monitor, i.e. supervise, the self-driving vehicle. The remote user can also intervene to provide supplemental user input, i.e. contributory, additional, additive, corrective, or remedial user input that affects how the vehicle is being controlled and driven. Depending on the degree of control afforded to the remote user, the remote user's intervention may temporarily override the autonomy of the self-driving vehicle.

FIGS. 1-3 depict a self-driving car 10 as one exemplary implementation of a self-driving vehicle usable in the self-driving vehicle system. The self-driving vehicle or self-driving car 10 includes a vehicle chassis 12, a motor supported by the chassis for providing propulsive power for the vehicle, a braking system for braking (decelerating) the vehicle and a steering system for steering the vehicle via a steering mechanism which is usually connected to the front wheels. The motor may be an internal combustion engine, e.g. a gas engine or a diesel engine. The motor may alternatively be an electric motor. The motor may be a hybrid-electric powerplant. In a variant, the vehicle may have multiple electric motors for driving different wheels. In another variant, the motor may be a hydrogen fuel cell. The vehicle may include a powertrain to transfer power from the motor to the drive wheels. For some vehicles, the powertrain may include, in addition to the motor (engine), a transmission gearbox, a drive shaft, and a differential. For an electric vehicle implementation, the vehicle includes a rechargeable battery or plurality of rechargeable batteries.

The vehicle of FIGS. 1-3 also includes a plurality of sensors i.e. environment-detecting sensors. The sensors may include RADAR, LIDAR, cameras and ultrasonic rangefinders. The vehicle of FIGS. 1-3 includes a first sensor 14, a second sensor 16, a third sensor 18, and a fourth sensor 20. In the illustrated embodiment of FIGS. 1-3, the first sensor 14 is a RADAR sensor, the second sensor 16 is a LIDAR sensor, the third sensor 18 is a camera and the fourth sensor 20 is a side view camera. A fifth sensor 22 is in this illustrated embodiment a rear (backup) camera. In the embodiment of FIGS. 1-3, the vehicle 10 includes an optional further camera, i.e. a driver perspective camera 30. Additional sensors may be provided on the vehicle 10, including additional camera, additional LIDAR and RADAR sensors.

The vehicle 10 may also be a mixed-mode human-drivable and self-drivable vehicle such as a self-driving car, truck, van, etc. that can be optionally driven directly by a human driver sitting in the driver's seat in which case the vehicle has three operating modes: (i) a conventional human driver mode with a human directly driving the vehicle using the steering wheel, brake pedal and accelerator as is conventionally done with non-autonomous vehicles; (ii) a self-driving mode in which the vehicle's processor or computing system drives autonomously without human input, whether a human is seated in the driver's seat or not, and (iii) a remote controlled mode using the technology described in this specification, whether a human is aboard the vehicle or not.

In the embodiment depicted in FIG. 4, a self-driving vehicle system 100 includes the self-driving vehicle 10 and a remotely situated vehicle control device 300 in data communication with the self-driving vehicle 10 and operable by a user situated outside of the vehicle. The expression "remotely situated" in most use cases means that the user is not within line of sight of the vehicle. The remote control is thus beyond line of sight (BLOS) in most cases although the technology may also be used to control a vehicle that is within line of sight. The vehicle 10 may operate without any human onboard or it may, in another implementation, operate with one or more humans onboard. In other words, in the latter implementation, one or more humans may be seated in the vehicle, e.g. in the driver's seat, front passenger seat or in the rear passenger seats, while the vehicle is operating autonomously or is being driven remotely in a remote control mode. In the remote control mode, the vehicle may be wholly or partially controlled by the remote user using the remote control device. In most implementations, the remote user is stationary, i.e. sitting or standing. In some other implementations, the remote user may be sitting in another moving vehicle, i.e. remotely controlling a first vehicle while riding in a second vehicle.

The self-driving vehicle 10 of FIGS. 1-3 further includes a processor 200 configured to receive analog or digital signals (data) from the sensors and to generate steering, acceleration and braking control signals for controlling the steering system, the motor and the braking system of the vehicle. The processor 200 may generate a steering control signal, an acceleration control signal and a braking control signal based on the signals received from the sensors. The processor may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a sunroof open signal, a sunroof close signal, a climate control signal, a seat heater signal, a windshield defroster signal, a windshield wiper activation signal, a wiper fluid squirt signal, to name but a few.

The processor 200 may be any microprocessor, computer, computing device, or microcontroller. As will be appreciated, in a variant, there may be multiple processors or computers working together, e.g. networked together via data buses, communication cables, or wireless links to share computational loads or to perform different tasks. In one embodiment, the vehicle comprises a self-driving computer or computing device that has a microprocessor operatively coupled to a memory, e.g. a flash memory and/or random access memory (RAM). The memory may store system data, configuration files and user-related data. There may be multiple memory devices in the vehicle. In a variant, data may be stored in a cloud-based memory accessible by the vehicle.

The self-driving vehicle 10 further includes a Global Navigation Satellite System (GNSS) receiver 210 for receiving satellite signals and for determining a current location of the self-driving vehicle. The GNSS receiver may be a Global Positioning System (GPS) receiver that decodes satellite signals transmitted by orbiting GNSS satellites 212. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multinational Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

In one embodiment, the system may switch automatically from user control to autonomous control in response to detecting that the user has not provided a control input for a predetermined period of time. Conversely, the system may switch automatically from autonomous control to user control if there is a system failure or if the GPS/GNSS signal needed for navigation is lost such that location determination (positioning) is no longer occurring. This may happen when the vehicle is inside a building, garage, tunnel, canyon or simply driving between tall buildings that prevent reception of a sufficient number of GNSS signals. In the latter case, when system seeks to switch from autonomous mode to remote control mode, the switchover may entail sending an alert or notification to the remote user and receiving a confirmation from the remote user that the remote user is taking over control of the vehicle. The confirmation may be a verbal command, a user input command via a graphical user interface or merely detecting that the user has started to provide control input to the vehicle through the remote control device. In another embodiment, the switchover from autonomous to remote control and vice versa may be triggered by a user command.

The self-driving vehicle 10 also includes a radiofrequency data transceiver 220, e.g. a wireless data transceiver for transmitting and receiving data wirelessly. In one embodiment, the data transceiver 220 is a cellular data transceiver.

The data transceiver 220 is configured to wirelessly communicate data from the vehicle to the remote control device by attaching communicatively to a base station transceiver 222. Data is transmitted and received over a cellular wireless network using cellular communication protocols and standards for packet data transfer such as GSM, CDMA, GPRS, EDGE, UMTS, LTE, etc. The vehicle may include a Subscriber Identity Module (SIM) card for GSM-type communications or a Re-Usable Identification Module (RUIM) card for CDMA-type communications. The data transceiver may optionally include separate voice and data channels. From the base station transceiver 222 the data is communicated in the illustrated embodiment to the remote control device 300 via the internet 250. Data may be encrypted to prevent unauthorized interception or hijacking of the vehicle.

The vehicle 10 may optionally include one or more data communication ports or sockets for wired connections, e.g. USB, HDMI, FireWire (IEEE 1394), etc. or ports or sockets for receiving non-volatile memory cards, e.g. SD (Secure Digital) card, miniSD card or microSD card. These physical data connections may be used to load data onto the vehicle memory or to copy data from the vehicle memory. For example, the data communication ports may be used to upgrade software on the vehicle, to obtain vehicle diagnostics for servicing and maintenance, or to upload configuration data to the vehicle memory to configure the vehicle for different types of remote control devices.

The self-driving vehicle 10 also includes a generally forward-facing camera 18, 30, e.g. a first-person view (FPV) camera, for generating FPV images that are transmitted as camera images data, e.g. FPV data, in real-time or substantially real-time via the radiofrequency data transceiver to the remotely situated vehicle control device 300. In a variant, there may be a plurality of cameras providing camera coverage surrounding the vehicle. In one implementation, there may be a main driver seat camera 30 or pair of stereoscopic cameras providing a driver's perspective. The driver seat camera 30 may be configured to pitch, roll and yaw (pan), i.e. rotate with respect to three axes, in response to remote user commands. The camera enables a remote user to supervise the self-driving vehicle. The processor 200 is further configured to receive supplemental vehicle control input from the remotely situated vehicle control device. The processor 200 is further configured to modify the steering, acceleration and braking control signals based on the supplemental vehicle control input. The control input from the remote user enables temporary remote control of the vehicle subject to certain limits and parameters as described herein.

The vehicle 10 may also include a night-vision camera or multiple night-vision cameras, e.g. thermal imaging or infrared cameras, which may be provided in addition to the normal (daytime) FPV camera(s). At night or in lowlight conditions, the night-vision images can be transmitted to the remote device for viewing by the remote user. In one variant, the remote user can switch between the night-vision imagery and the normal camera imagery either automatically or manually, e.g. by interacting with a user interface element or by uttering a verbal command. In another variant, the system produces a hybridized image constructed from both the normal camera image and the night-vision camera.

In the embodiment depicted in FIGS. 1-3, the vehicle 10 includes a side-facing camera 19 for videotelephony with a person outside of the vehicle, e.g. when the vehicle is stopped, idling or parked. This side-facing camera 19 may be used to speak to a police officer, roadside assistance provider, gas station attendant, supercharger attendant, toll booth attendant, parking booth attendant, etc.

In one embodiment, the self-driving vehicle 10 includes an internally facing camera, a video display and a speaker inside a cabin of the vehicle to provide videotelephony between a passenger in the cabin and a user of the remotely situated vehicle control device. The combination of the internally facing camera, the video display and the speaker provides a two-way video interface for videotelephony, i.e. video conferencing, video chat, etc. In a variant, the vehicle can include an audio interface (microphone and speaker) for a remote user to communicate with one or more passengers in the vehicle. This is useful for a taxi or limousine. This is also useful for communicating with friends or family who are riding in a self-driving vehicle.

In the embodiment depicted in FIGS. 1-3, the vehicle further comprises a trunk-mounted video camera 90, video display and speaker for videotelephony with a person loading an object into the trunk of the vehicle. For example, the trunk-mounted camera 90 may be a video camera. There may be a video display and speaker mounted in the trunk to provide two-way videotelephony. The trunk-mounted camera may be used to communicate with a person loading the object into the trunk. For example, the vehicle may be autonomously or remotely driven to a store to pick up an object. As an example, the vehicle may be driven to a supermarket to pick up groceries, to a pharmacy to pick up a prescription, to a hardware store to pick tools or home renovation materials, to a department store to pick up clothes, electronics, gifts, or any other items, wares or goods, etc. In one scenario, a store employee carries the items outside and then loads them into the vehicle. The trunk-mounted camera, video display and speaker enables the remote user to communicate in real-time with the store employee loading the object or objects into the trunk of the vehicle.

In one embodiment, the vehicle comprises a trunk-mounted code reader 91 comprising one or more of an NFC chip reader, RFID reader, QR code scanner or bar code scanner for identifying the object being loaded into the trunk. Following the above example, the store employee may scan the objects to electronically verify that the ordered or purchased items correspond to the objects being loaded into the vehicle.

In another embodiment, the vehicle comprises a machine vision subsystem that includes the camera for optically identifying the object from one or more images captured by the trunk-mounted camera. The machine vision subsystem may be programmed to recognize certain objects that the user is picking up using the autonomous or remotely controlled vehicle. The machine vision subsystem may also receive image data, e.g. from a website, showing a visual representation of the item that has been ordered or purchased to thereby provide an image for correlation with the imagery captured by the camera. In a variant, the vehicle may transmit a signal containing a code from the purchase receipt upon arrival at the store to identify the order to be delivered to the vehicle. The vehicle may also transmit a pickup request comprising vehicle identification information to the store. The vehicle identification information may include the make, model, year and colour of the vehicle. For example, the vehicle identification information might indicate the pickup vehicle is a 2017 silver Honda Accord. The vehicle identification information might also provide a GPS pinpoint for the store, indicating where the vehicle is waiting outside the store, which is particularly useful in the case of a large store having an expansive outdoor parking lot such as, for example, Walmart or Costco. In another variant, the vehicle may be configured to establish a short-range wireless communication link with the store, e.g. via Bluetooth or Wi-Fi, in order to exchange pickup-related information with the store and to coordinate a precise pickup location in the parking lot outside the store.

In one embodiment, the self-driving vehicle system further comprises a payment processor to electronically perform a commercial transaction. In one embodiment, the payment processor performs the transaction automatically in response to detecting that the object has been loaded into the vehicle. In the foregoing example, the store employee scans the object and loads the object into the trunk of the vehicle. Upon detecting that the correct object has been scanned, the vehicle may automatically launch its payment processor to complete the purchase of the object. Alternatively, the vehicle may send a confirmation request to the remote user who can then confirm the purchase by providing user input to the remote control device.

In one embodiment, the vehicle comprises a one-way slot 92 for inserting the object into the trunk of the vehicle. The one-way slot 92 may be covered by a hinged door-like flap that opens only in one direction while being spring-loaded or otherwise mechanically biased to automatically close when force is removed from the door-like flap. The flap may be actuator driven in another embodiment. This one-way slot 92 enables insertion of an object into the trunk while visually obscuring the contents of the rest of the trunk and furthermore preventing the person loading the object into the trunk from removing other contents of the trunk. This prevents or inhibits theft during the loading operation.

In the embodiment illustrated in FIG. 4, the remotely situated vehicle control device 300 includes an internet-connected computing device 302 that includes a device data transceiver 304 (modem, router, etc.) for receiving the camera data, e.g. the FPV data, a device processor 306 for processing the camera data, e.g. the FPV data, and for regenerating the camera (e.g. FPV) images, a memory 308 for storing or buffering the image data, and a device display 310 cooperating with the device processor to display the images 314, e.g. the FPV images, for the user 312. The remotely situated vehicle control device 300 also includes a user input device 316 configured to receive the supplemental vehicle control input.

Figure 5:
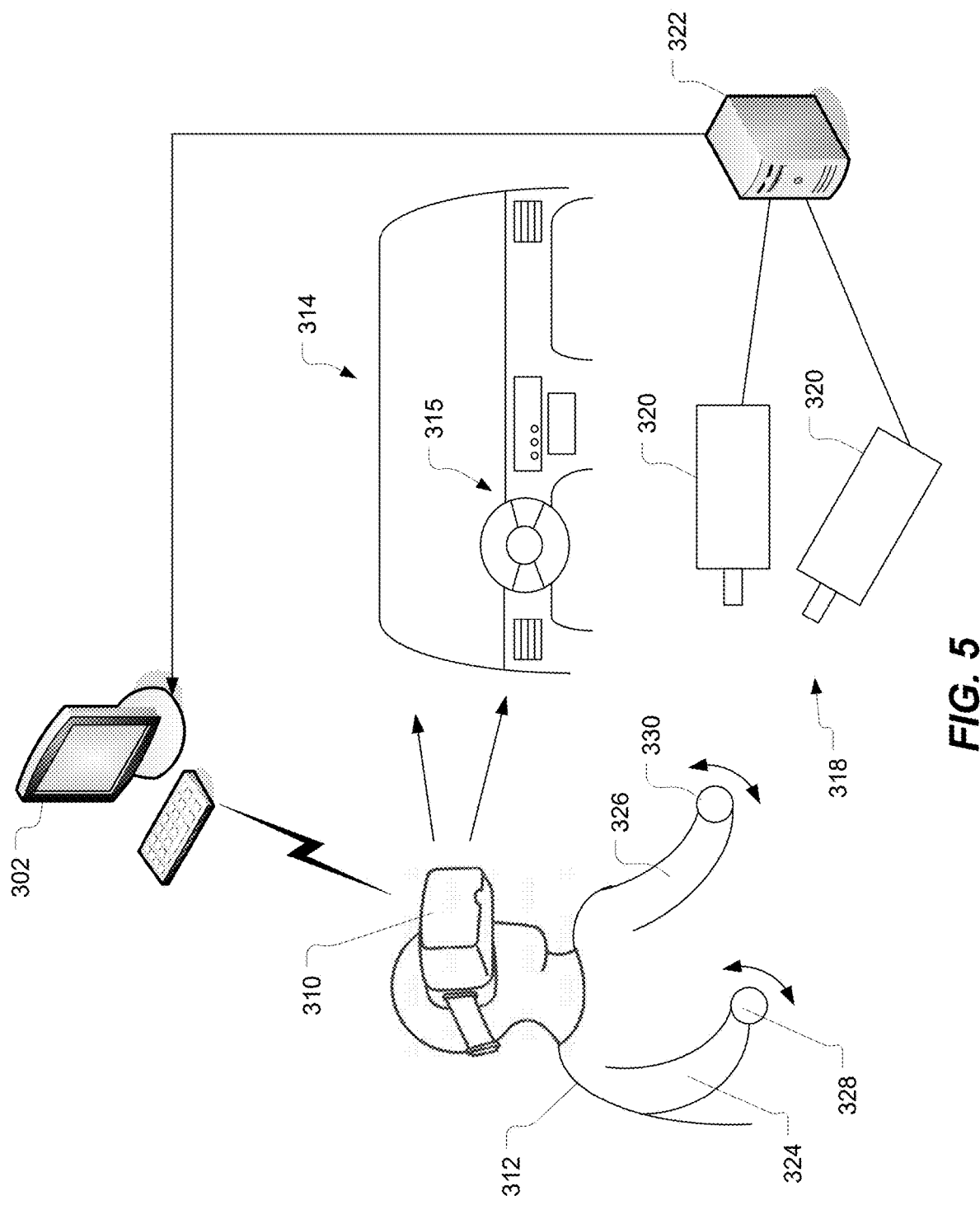
FIG. 5 depicts the system of FIG. 4 further including a gesture-recognition system for controlling the vehicle.

As depicted by way of example in FIG. 5, the user input device 316 may be a gesture-recognition device 318 having gesture-recognition cameras 320 and a gesture-recognition computer 322. The gesture-recognition device is configured to recognize gestures of the user for example in relation to the movements of the right arm 324, left arm 326, right hand 328 and left hand 330 or any subset thereof. The device processor 306 within the computing device 302 is configured to generate supplemental vehicle control input data and to cooperate with the device data transceiver 304 to transmit the supplemental vehicle control input data to the self-driving vehicle 10. The gesture-recognition device may be a purely vision-based system or it may require sensors or positioning devices affixed to the user or attached to gloves or other garments or objects worn by the user.

To summarize with respect to FIGS. 1-4, the self-driving vehicle uses its processor to receive signals from the sensors and to generate steering, acceleration and braking control signals for controlling the steering system, the motor and the braking system of the vehicle for autonomous driving. The vehicle includes a GNSS receiver for receiving satellite signals and for determining a current location of the self-driving vehicle for navigation. The vehicle includes a first-person view (FPV) camera or multiple cameras for generating FPV images that are transmitted in real-time via the radiofrequency data transceiver to a remotely situated vehicle control device. The processor is further configured to receive supplemental vehicle control input from a user operating the remotely situated vehicle control device. The processor is further configured to modify the steering, acceleration and braking control signals based on the supplemental vehicle control input, e.g. within a safe driving envelope as will be described below in greater detail.

In the embodiment depicted in FIGS. 4 and 5, the remotely situated vehicle control device 300 is, or includes, a headset/helmet/goggles 310 worn by the user 312 having a display presenting FPV camera imagery and/or augmented reality (AR) imagery and/or virtual reality (VR) imagery 314 that includes a view outside the windshield as would be seen by the driver and also a view of inside the vehicle as would also be seen by the driver. In one embodiment, the FPV/AR/VR headset/helmet/goggles 310 provides FPV/AR/VR representations 315 (i.e. FPV and/or augmented reality and/or virtual reality representations) of vehicle controls to enable the user 312 of the headset/helmet/goggles 310 to remotely control the vehicle 10 by interacting with the virtual reality or augmented reality FPV representations 315 of the vehicle controls. The headset/helmet/goggles present pure FPV images, augmented reality FPV images and/or virtual reality images. For the purpose of this specification, the term "headset" is meant to include both helmets and goggles and other display devices worn by the user. In addition to the camera imagery, the headset may replicate actual real-time sound and noise captured by one or more microphones inside the cabin of the vehicle which may include for example external wind noise, engine noise and road-tire noise, climate control noise, voices of passengers, music from the sound system, etc. In one embodiment, the headset is configured to receive user input to suppress or enhance any one or more of the different types or sources of noise. Thus, the remote user can suppress all noise except human voices to better communicate with the passengers. The remote user may wish to enhance engine noise to better hear and diagnose a mechanical problem.

The headset in one embodiment may be a VR helmet, VR goggles, or any other VR-type apparatus providing an immersive visual reconstruction of the camera images. The VR headset may comprise a stereoscopic head-mounted display presenting a separate image for each eye to reproduce the driver's visual perspective. The VR headset may comprise stereo speakers or earphones to reproduce the ambient noises of the vehicle for a more immersive experience. The VR headset may include head motion tracking sensors that may include one or more gyroscopes, accelerometers, or structured light systems. The VR headset may also have one or more eye-tracking sensors.

The headset in another embodiment may be an augmented reality (AR) headset or FPV goggles or any hybrid technology that combines FPV and AR. In another embodiment, the headset is a hybrid-image headset providing a variable mixture of pure FPV camera imagery, augmented reality and virtual reality representations.

In one embodiment, the user wearing the VR headset or FPV goggles is able to view both the FPV camera imagery and the vehicles controls. The user may remotely interact with the vehicle controls. The hands, fingers, thumbs and forearms of the user may be seen, either as pure imagery, AR or VR imagery to enable the user to interact with the representations of the vehicle controls.

In one embodiment, the FPV/AR/VR representation 315 of the vehicle controls includes a FPV/AR/VR representation of a steering wheel. In one embodiment, the headset generates and presents representations of automotive controls (e.g. steering wheel, dashboard, dials, buttons, transmission shifter, brake pedal, accelerator pedal, etc.) thus providing a full visual rendition or recreation of the driver experience to enable the remote driver or user to control the vehicle using gestures interacting with the representations of the automotive controls. The headset is complemented by a three-dimensional gesture recognition system that detects user gestures and correlates the position of the user's hands and fingers to identify the control or interface with which the user intends to interact. For example, the user can reach out and virtually hold and turn the steering wheel to effect real-world steering input on the vehicle. The user can be seated and use his or her foot to depress a virtual representation of a brake pedal or an accelerator pedal to brake and accelerate. The user can interact with a representation of a lever to turn on a turn signal light. The user can view a picture-in-picture view of the rearview mirror or the side mirrors. For the comfort of the passengers, the remote user can operate the real-world air conditioning, heating, climate control, radio, sound system, seat heaters, seat ventilation, etc. by making gestures in the virtual reality representation. The remote user can open windows, close windows, open the sunroof, close the sunroof, turn on the ignition, turn off the ignition, operate the transmission, turn on headlights, fog lights, interior dome lights, etc. The headset provides a complete FPV/AR/VR representation of the vehicle cabin. By gesturing, the user wearing the headset can virtually interact with vehicle controls to remotely control the vehicle. The headset may have a head motion sensor to detect head orientation. When the head of the user moves, the FPV camera can rotate (yaw or pitch) to mimic the movements of the user. Thus, if the user turns his or her head to the left, the FPV camera swivels automatically to the left and presents a view through the left window. A three-axis head tracker module in the headset enables the user to control pan, tilt, and roll of your vehicle-mounted FPV camera using the motion of the headset.

Figure 6:
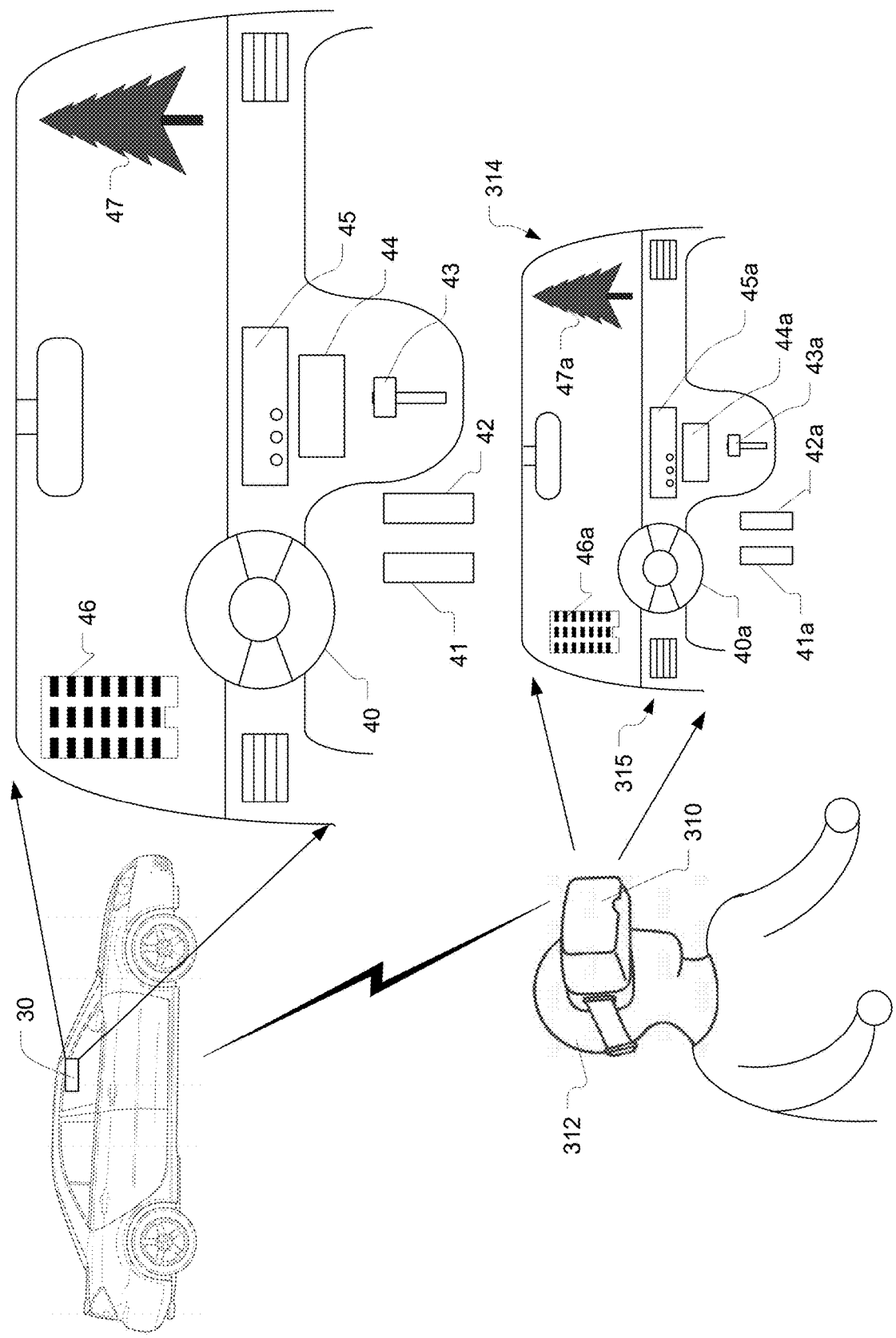
FIG. 6 depicts a system in which the VR/AR/FPV headset displays a completion replication of all vehicle controls.

As illustrated by way of example in FIG. 6, the real-world steering wheel 40 in the vehicle is represented by a user-interactive FPV/AR/VR representation 40*a* of the steering wheel 40. The real-world steering brake and accelerator pedals 41, 42 may be optionally represented by user-interactive FPV/AR/VR representations 41*a*, 42*a* of the brake and accelerator pedals 40. Note that in many embodiments, the remote user will not lower his head far enough to see these pedals. Therefore, in some embodiments, the braking and acceleration functions may be replaced with other control elements as described below with respect to FIG. 19 or left to be managed exclusively by the autonomous vehicle. The real-world transmission shifter 43 in the vehicle is represented by a user-interactive FPV/AR/VR representation 43*a* of the transmission shifter 43. The real-world climate control interface 44 in the vehicle is represented by a user-interactive FPV/AR/VR representation 44*a* of the climate control interface 44. The real-world sound system interface 45 in the vehicle is represented by a user-interactive FPV/AR/VR representation 45*a* of the sound system interface 45. Objects outside of the vehicle that are seen through the forward-facing FPV camera(s) are also represented, either purely as FPV camera images, augmented or replaced by VR images. For example, a building 46 and a tree 47 may be represented by an FPV/AR/VR representation 46*a* of the building 46 and an FPV/AR/VR representation 47*a* of the tree 47. In one embodiment, the vehicle performs object recognition on the objects and then overlays AR information about the objects, e.g. information about the building, type of trees, or other points of interest, landmarks, commercial establishments, etc. Thus, the remote user can access information about the displayed objects by making a request for more information using a voice command or other user input.

In the embodiment of FIG. 6, the VR/AR/FPV headset may be configured to display a completion replication of all vehicle controls. In other embodiments, the headset may only depict a subset of the vehicle controls. In another embodiment, the headset may be configured to depict some controls in pure FPV, other controls in AR and yet other controls in VR.

Figure 7:
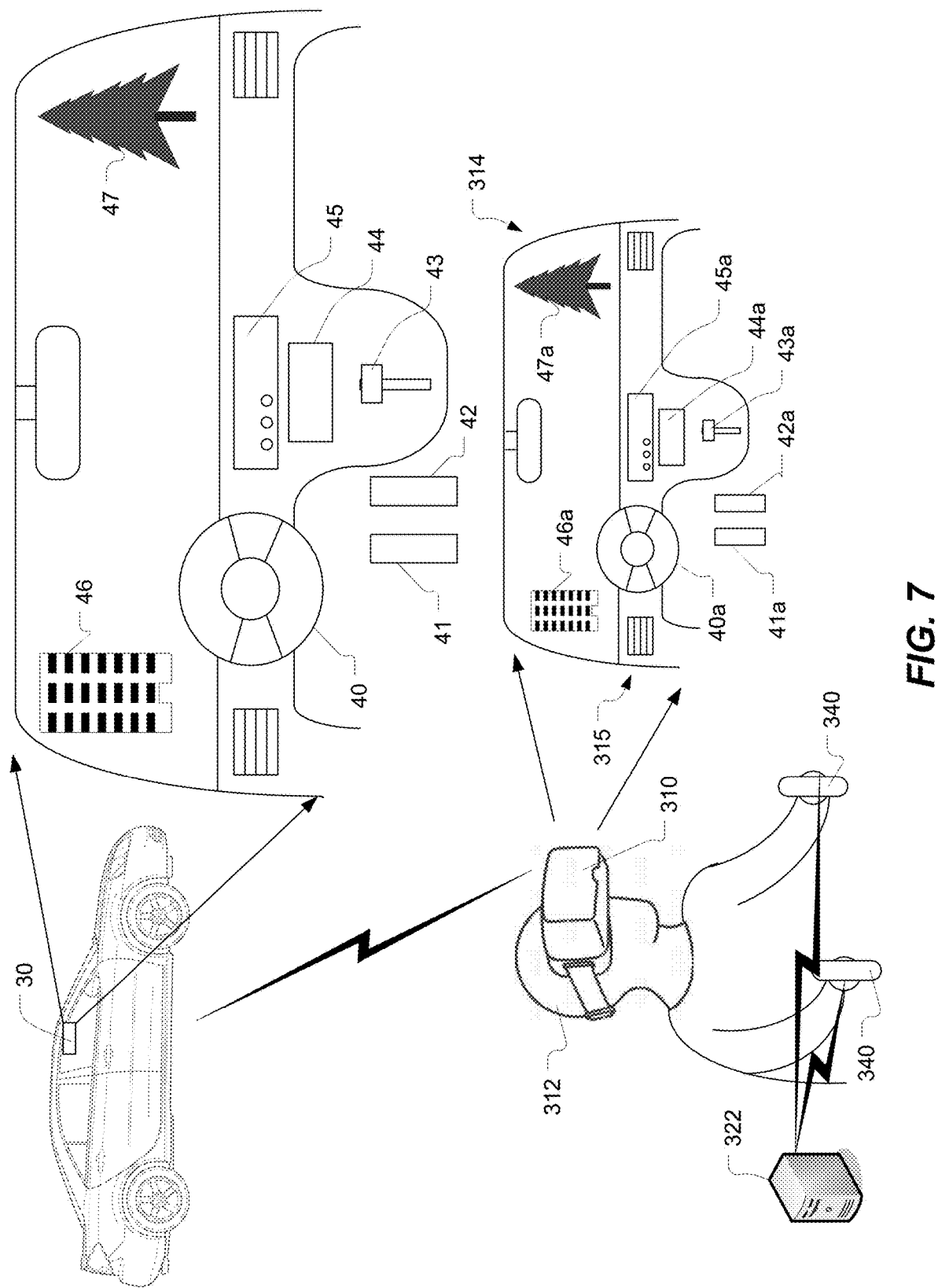
FIG. 7 depicts a system that includes a pair of handheld controllers for providing user input to remotely control the vehicle.

FIG. 7 depicts a system that includes a pair of handheld controllers 340 for providing user input to remotely control the vehicle. Although two handheld controllers 340 are depicted, in one embodiment there may be a only a single handheld controller 340. For example, the handheld controller(s) may include acceleration and braking buttons, akin to video game controllers to accelerate and brake the vehicle. The handheld controllers may also include a steering device to steer the vehicle akin to video game controllers. In another embodiment, the system includes a gaming-style steering wheel (racing wheel) and/or foot pedals with or without force feedback to enable the remote user to provide input to the remote device. As is known there are a variety of wheel and pedals sets for video gaming for PC, Microsoft Xbox, PlayStation, etc that enable users to provide realistic driving-like commands to a driving-type video game such as Forza Motorsport and Gran Turismo. The same gaming-style steering wheel and/or foot pedals may be connected to the remote device by a USB or other wired connection or by Bluetooth® or other wireless connection to enable the user to remotely drive the vehicle. Alternatively or additionally, the system may include a joystick, gear shifter and/or yoke connected to the remote device. The steering input may thus be provided using any suitable gaming-style steering wheel and pedal set such as for example the Fanatec® ClubSport Wheel Base™ by Endor AG., Logitech G920 Driving Force by Logitech International S.A, a Thrustmaster T-GT Racing Wheel by Guillemot Corporation, etc.

Figure 8:
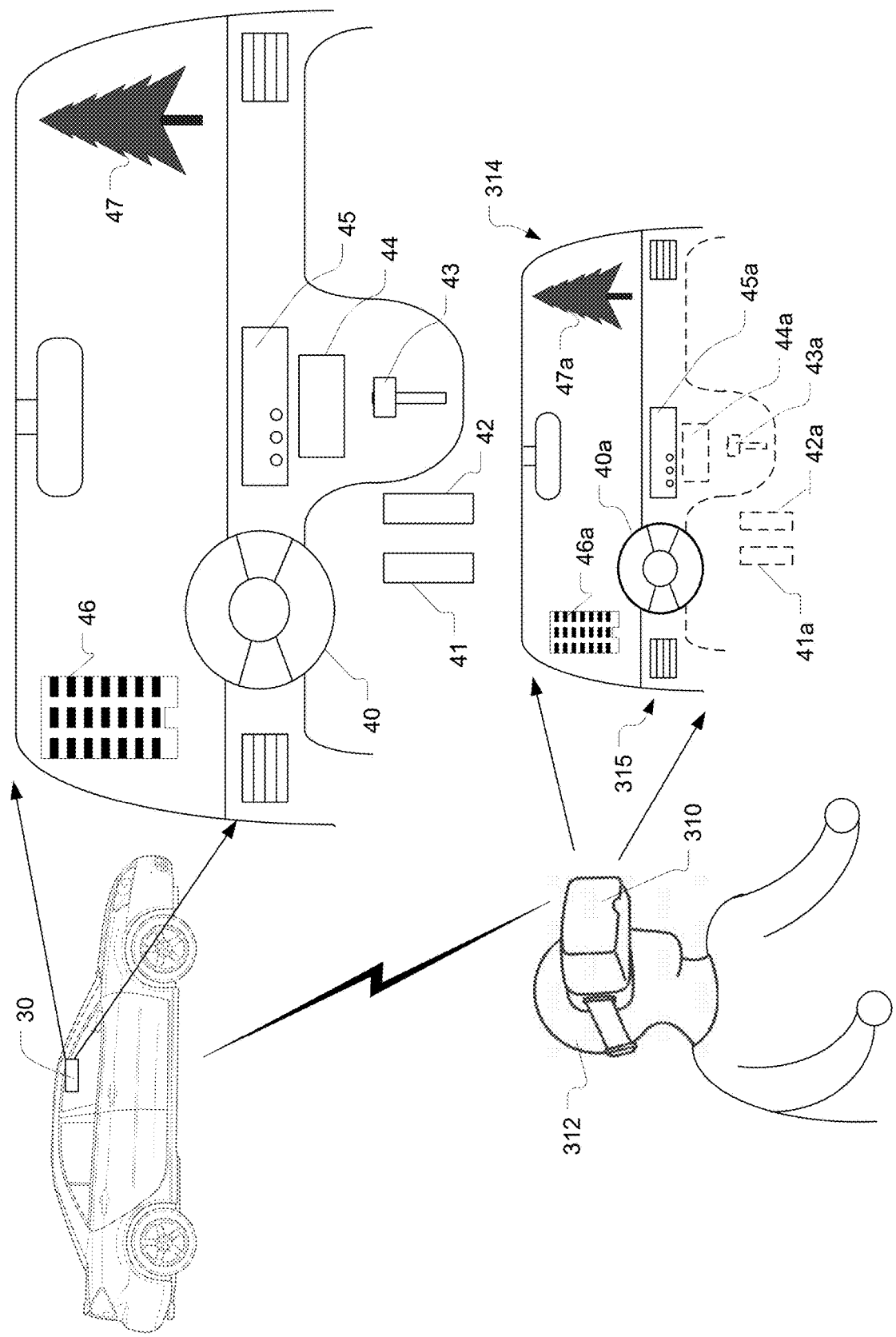
FIG. 8 depicts a system in which the VR/AR/FPV headset displays a replication of only a subset of the vehicle controls.

FIG. 8 depicts a system in which the VR/AR/FPV headset displays a replication of only a subset of the vehicle controls. In the example embodiment of FIG. 8, only the steering wheel 40 and the sound system interface 45 are user-controllable. Controls that are currently user-controllable may be visually indicated or highlighted. For example, the headset may use AR highlighting, labelling, arrows, icons, overlays, colors, differential resolution effects or other visual indicators to emphasize the vehicle controls that are user controllable. For example, in FIG. 8, the steering wheel representation 40*a* and the sound system interface 45*a* are visually emphasized to indicate that these two controls may be used by the remote user while all other functions are autonomous. In another embodiment, the headset may visually indicate any vehicle control with which the user is actually interacting to signify that the system is receiving user input. In another embodiment, the resolution of the currently active controls may be greater such that the other controls are slightly blurred out to create a peripheral vision effect to focus attention on those controls that are active.

Figure 9:
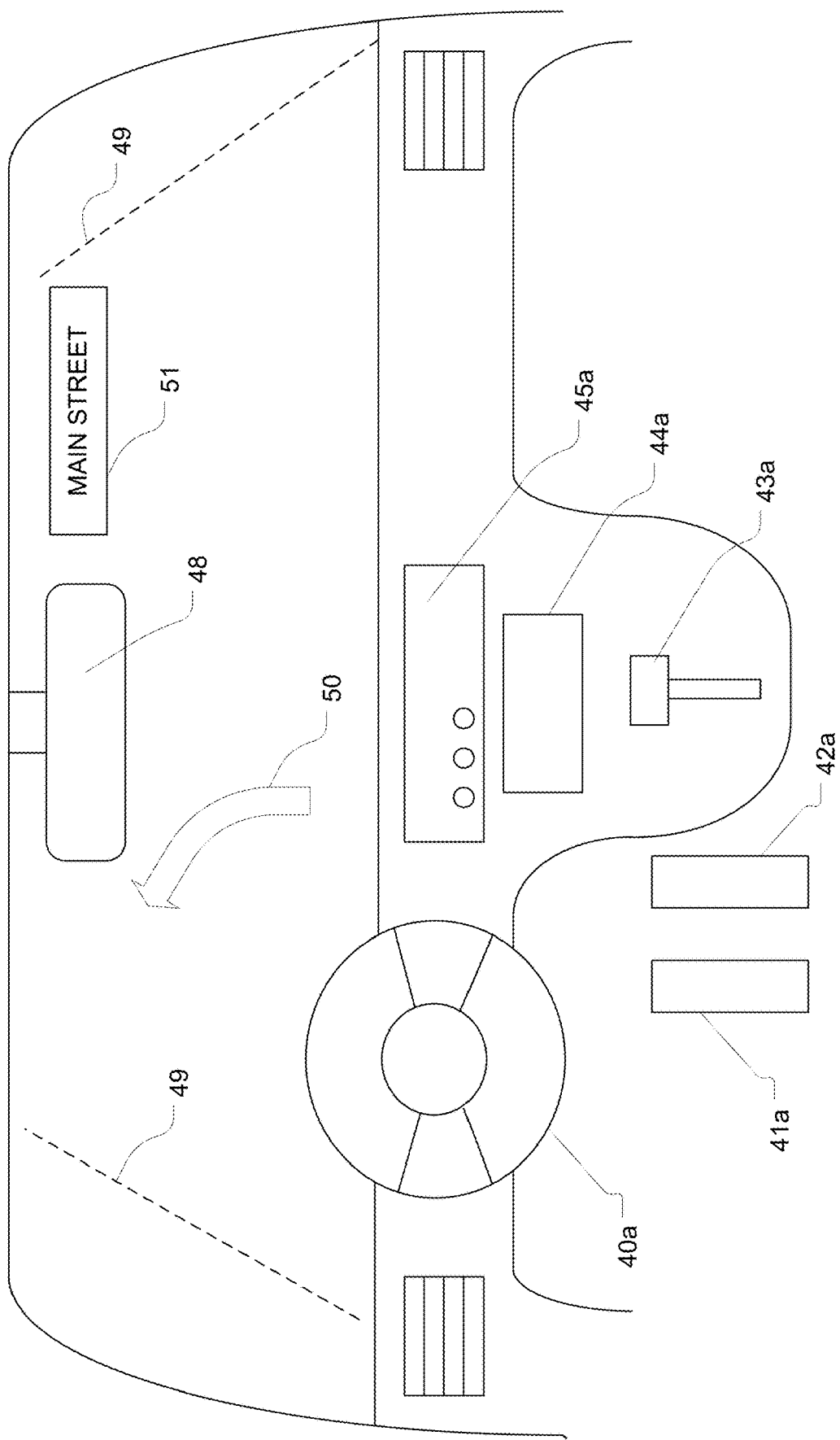
FIG. 9 depicts a system in which the headset displays an augmented reality view overlaid on the FPV camera images.

FIG. 9 depicts a system in which the headset displays an augmented reality view overlaid on the FPV camera images. In this example, the rearview mirror representation 48 may be a processed video feed (inverted and optionally enhanced to reduce unwanted visual effects like overly bright headlights) from a rearwardly facing camera. The headset may display AR representations of lanes 49 or road-sidewalk edges, road-median edges, road-shoulder edges or other contours to help the remote user drive the vehicle. The headset may also depict an AR representation of a navigation instruction or navigation cue e.g. a turn arrow 50. The headset may display an AR representation of a street name 51. The AR representations may be user configurable to select what sort of augmented reality to provide. The AR representations may also be activated and deactivated in response to voice commands or other user input while driving.

Figure 10:
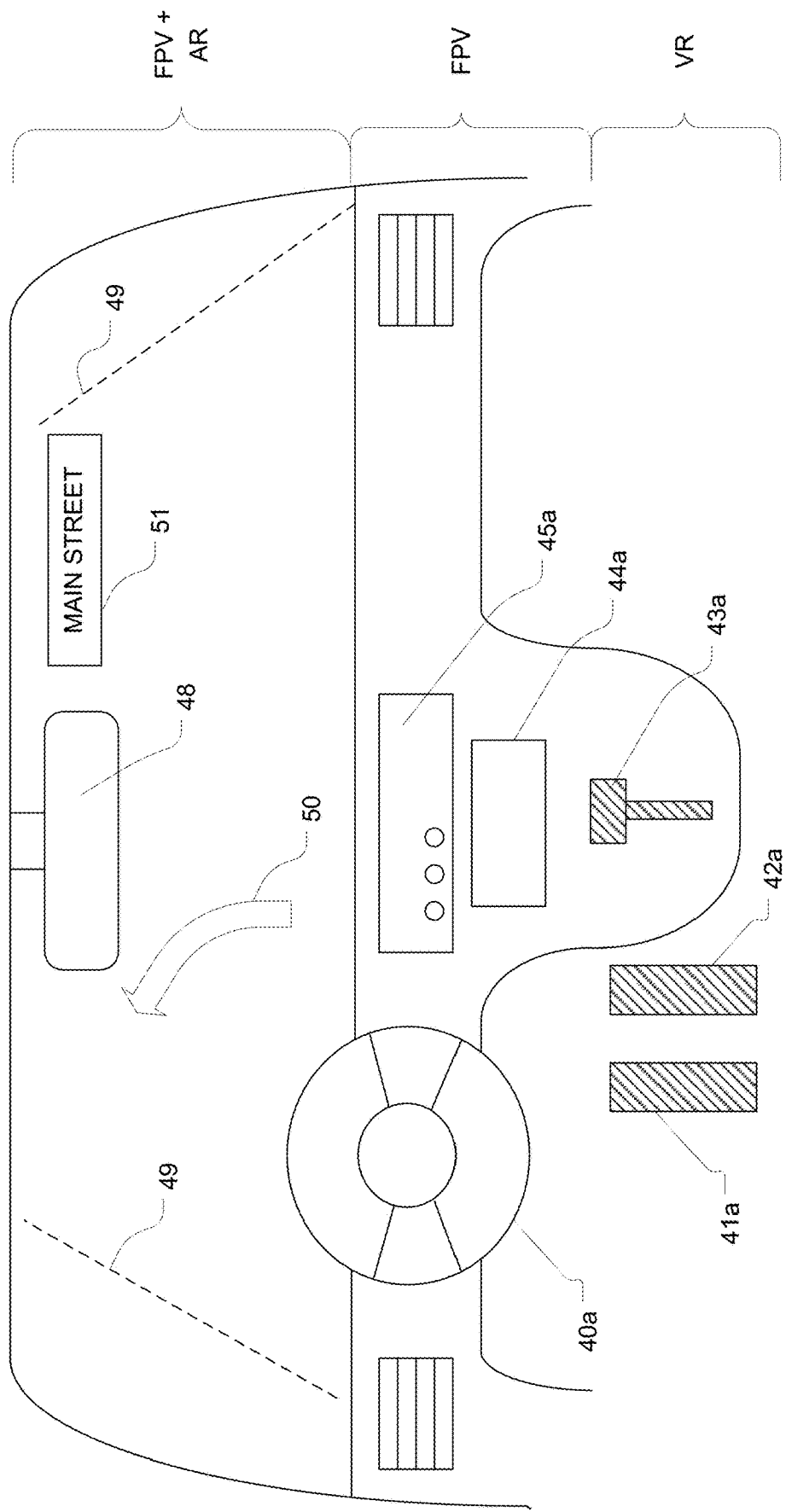
FIG. 10 depicts a system in which the headset displays a composite image comprising a virtual reality view, a pure FPV view and an FPV/augmented reality view.

FIG. 10 depicts a system in which the headset displays a composite image comprising a virtual reality view, a pure FPV view and an FPV/augmented reality view. In this example, the headset presents a lower VR portion of purely VR imagery, an intermediate FPV portion of purely FPV imagery and an upper augmented FPV portion that is generated by applying augmented reality to the FPV imagery. In this embodiment, there are three distinct bands of views. The vertical extent of each band may be user-configurable.

Figure 11:
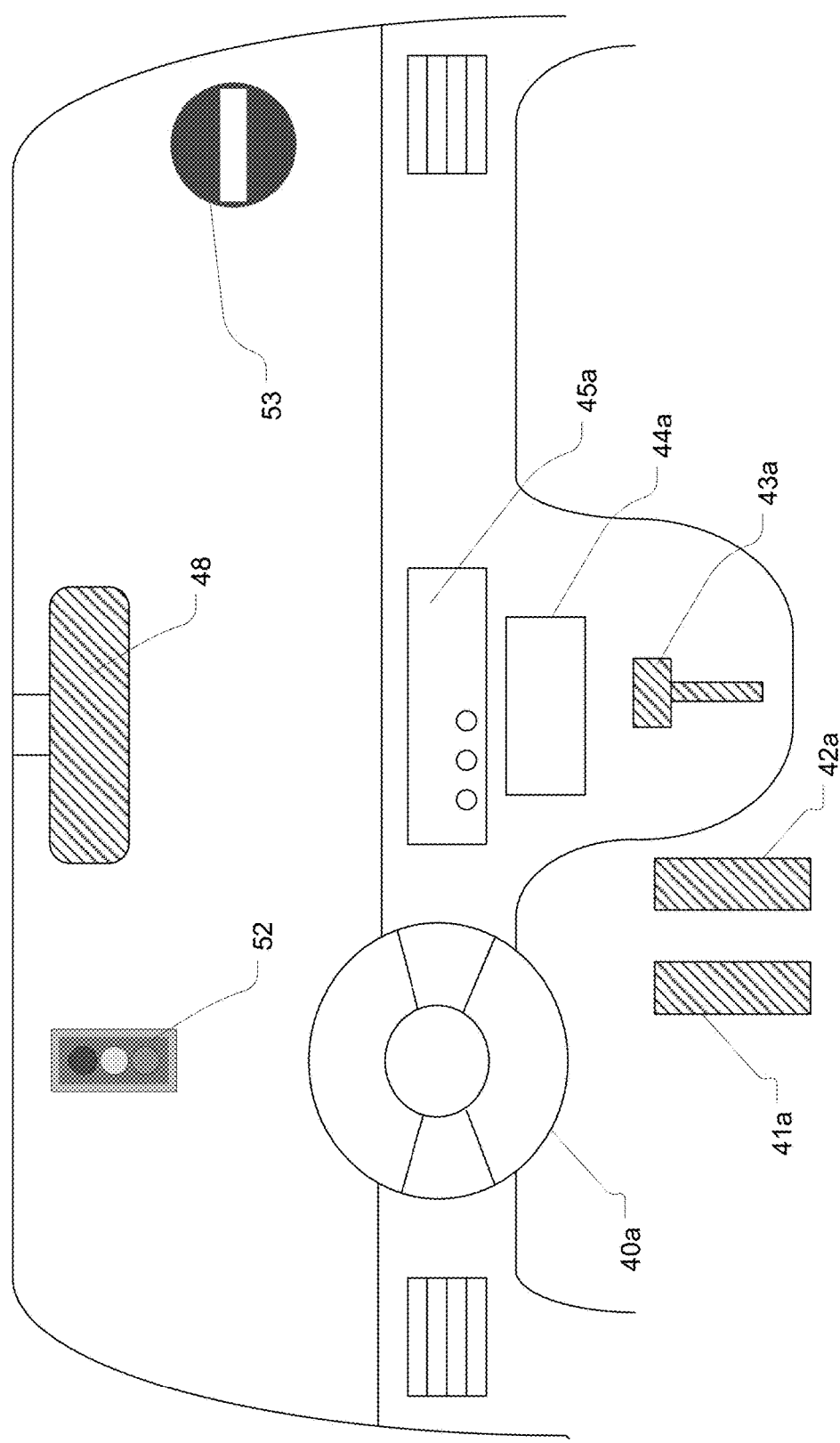
FIG. 11 depicts a system in which specific vehicle controls are displayed in virtual reality while the remainder of the view is an FPV/augmented reality view.

FIG. 11 depicts a system in which specific vehicle controls are displayed in virtual reality while the remainder of the view is an FPV/augmented reality view. In this example, the brake pedal representation 41a, the accelerator pedal representation 42a, the transmission shifter representation 43a and the rearview mirror representation 48 are VR images while the remainder is an augmented reality view of the FPV camera imagery. The AR reality view may include enhanced or enlarged traffic lights 52 and traffic signs 53 to facilitate the task of remotely driving the vehicle.

Figure 12:
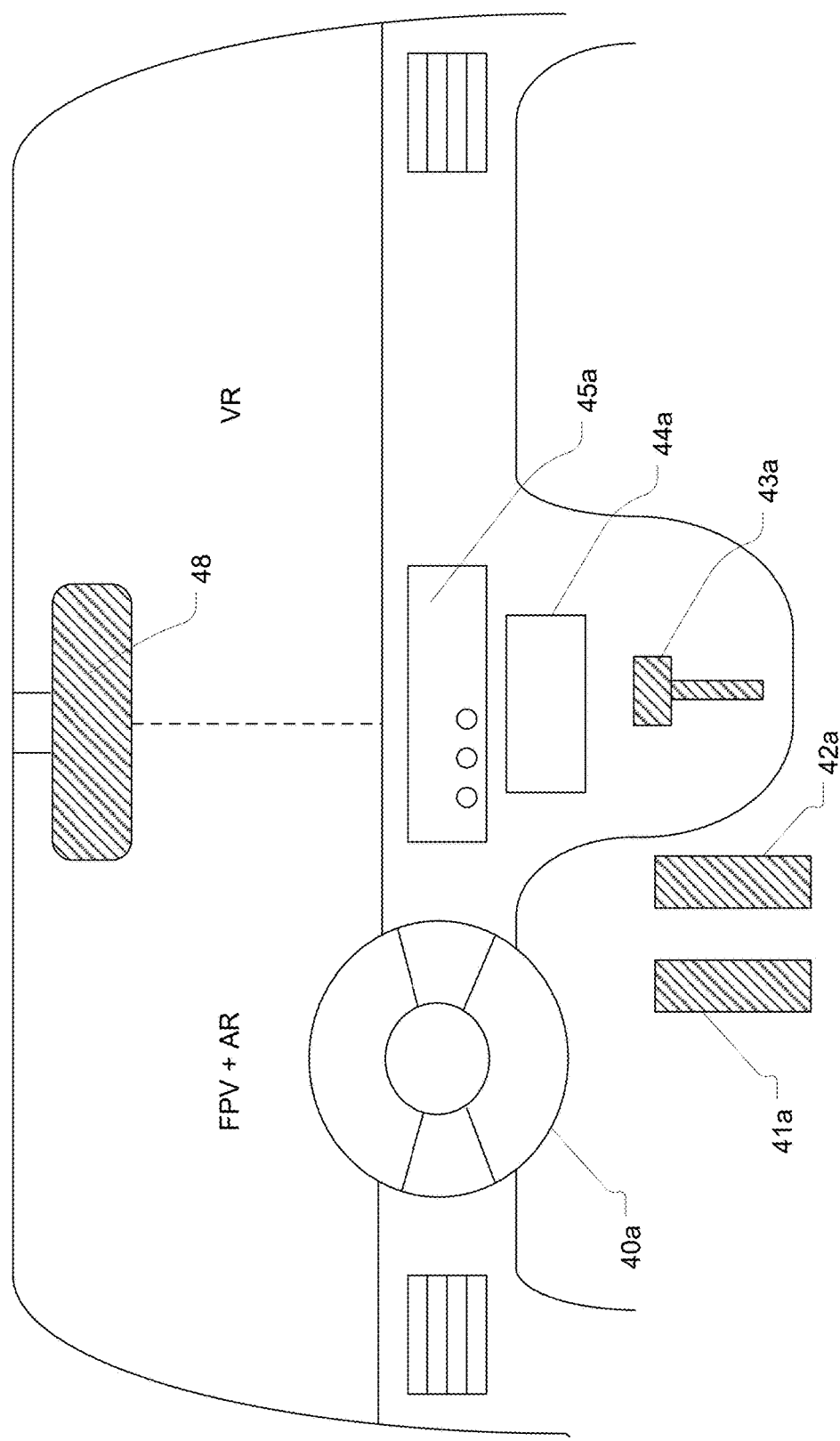
FIG. 12 depicts a system in which one side of the view is a VR view and the other side is an FPV/AR view.

FIG. 12 depicts a system in which one side of the view is a VR view and the other side is an FPV/AR view. A split view enhances overall driver awareness in certain circumstances, e.g. where visibility conditions are poor. For example, the split view may be useful at night, in heavy rain, in a blizzard, in dense fog, or when driving toward a rising or setting sun or when facing bright oncoming headlights. In one embodiment, the AR view and/or the VR view may be generated at least partially using infrared or thermal imagery captured by an infrared or thermal imager on the vehicle.

Figure 13:
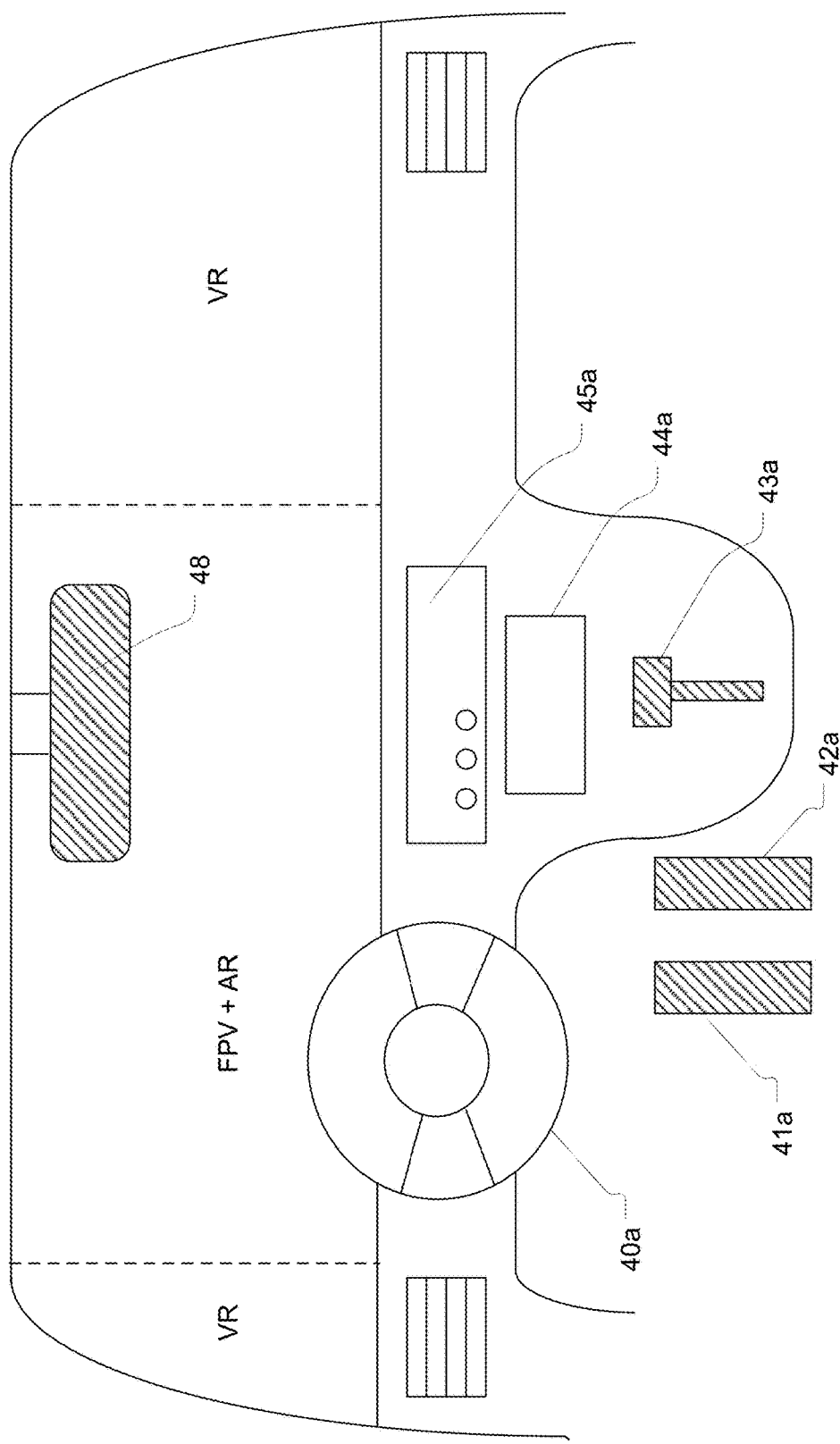
FIG. 13 depicts a system in which two sides of the view are VR views and the central portion is an FPV/AR view.

FIG. 13 depicts a system in which two sides of the view are VR views and the central portion is an AR/FPV view. In this example, the rearview mirror representation 48 remains a VR view within the surrounding AR/FPV portion. The division of the overall view into VR and AR/FPV views is user-configurable. The horizontal extent of each portion of the overall view may be user-configurable.

Figure 14:
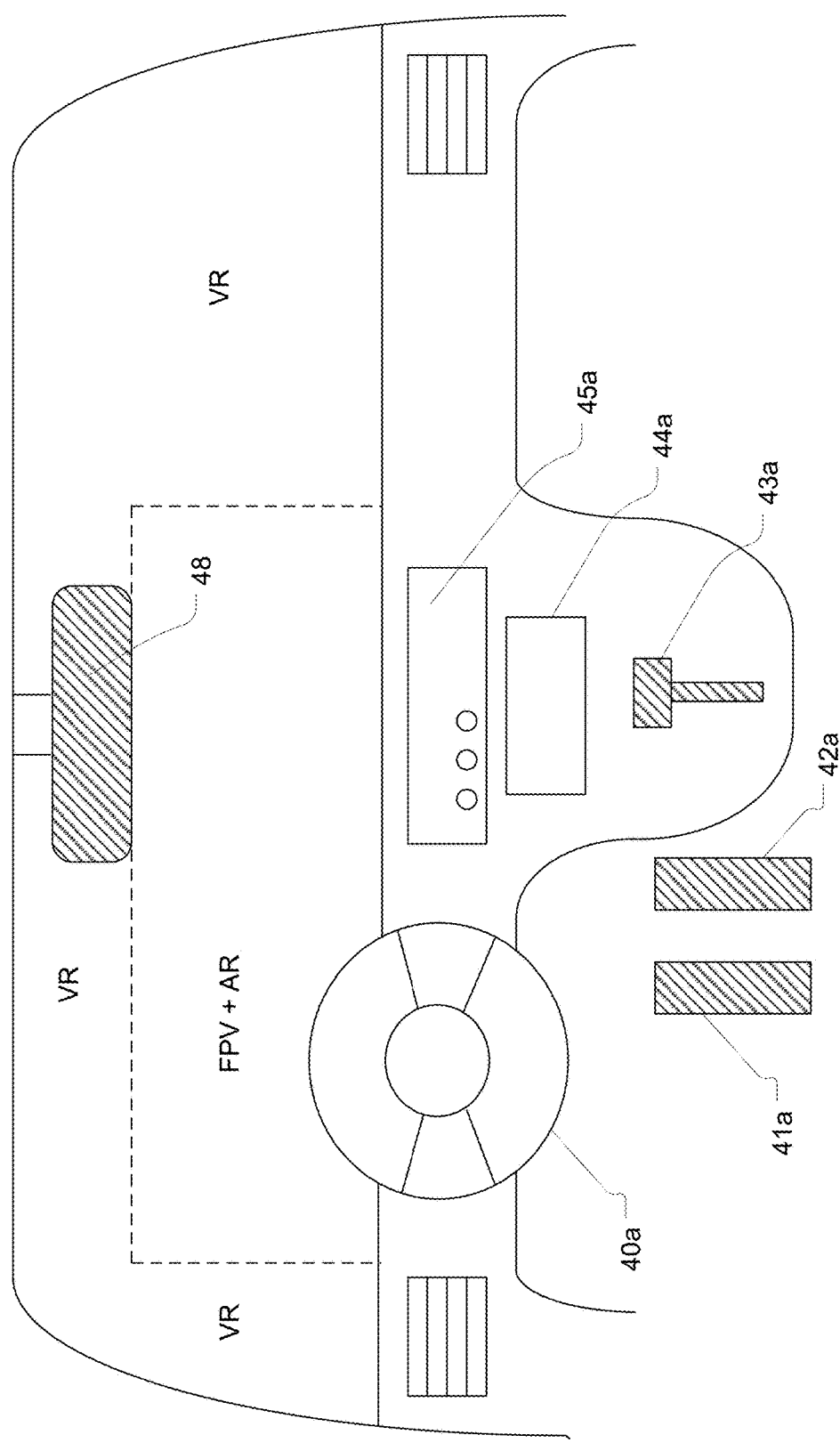
FIG. 14 depicts a system in which an inner portion is an FPV/AR view and a surrounding portion is a VR view.

FIG. 14 depicts a system in which an inner portion is an AR/FPV view and a surrounding portion is a VR view. In a variant, the size of the inner portion is automatically adjusted in response to detecting a light condition from one of the cameras. For example, if the vehicle detects that the ambient light is too low (e.g. night is falling) then the vehicle increases the size of the surrounding VR view by diminishing the inner portion (the AR/FPV portion). In one variant, the vehicle may completely eliminate the inner portion (the AR/FPV portion) under certain conditions, e.g. total darkness, near-total darkness, blinding incoming light from the rising or setting sun or from oncoming headlights.

Figure 15:
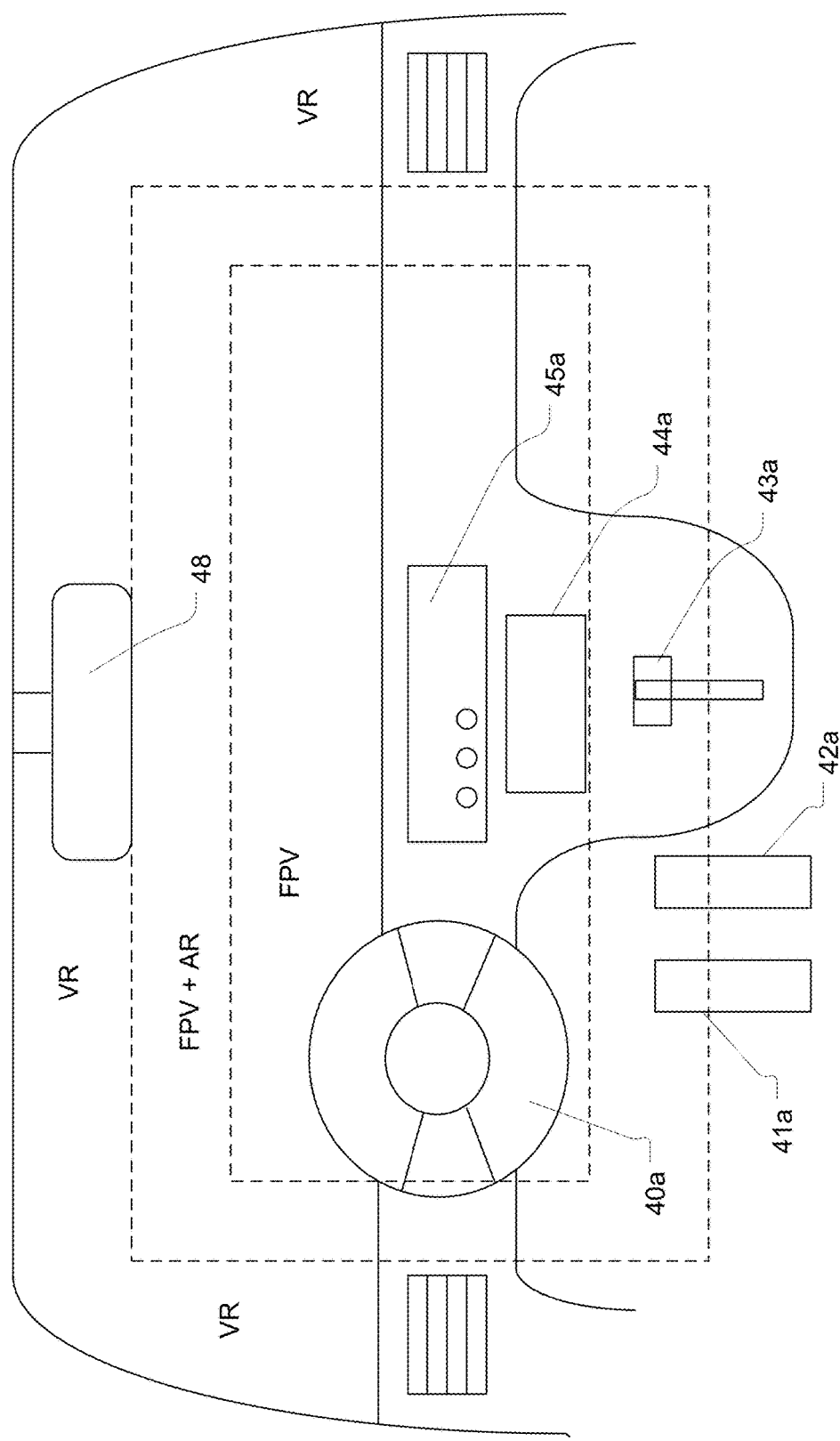
FIG. 15 depicts a system in which an inner portion is a pure FPV view, a immediately surrounding portion is an FPV/AR view and an outer surrounding portion is a VR view.

FIG. 15 depicts a system in which an inner portion is a pure FPV view, an immediately surrounding portion is an FPV/AR view and an outer surrounding portion is a VR view. In this example embodiment, there are three concentric views that may be user-configurable in response to user input or automatically adjusted based on predetermined settings. In this example, the intermediate FPV/AR view may be partially shaded to reduce glare or excessive light.

Figure 16:
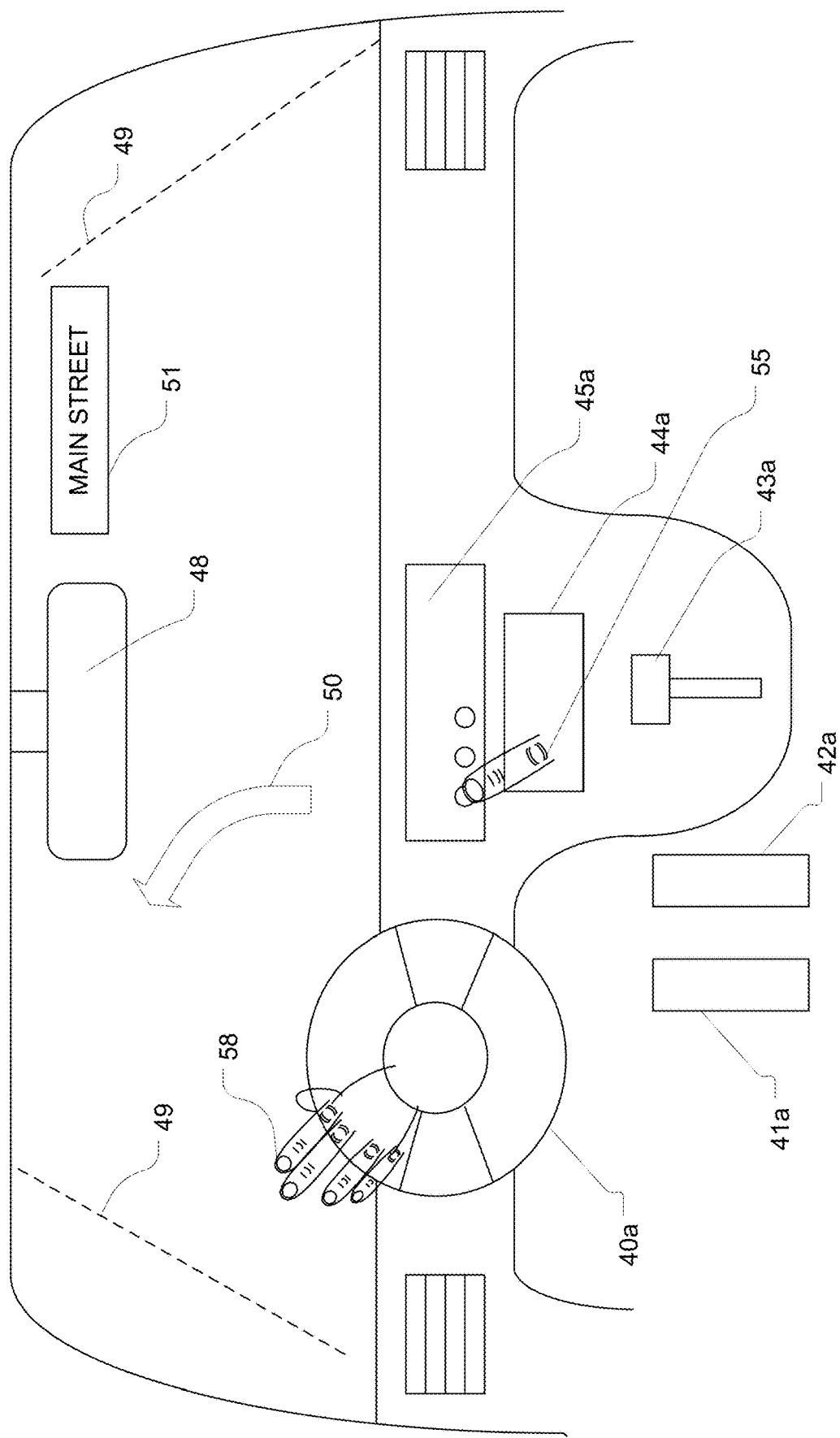
FIG. 16 depicts a system in which the user's hand and/or finger(s) is displayed using AR or VR to show the user where his or her hand and/or finger is located relative to the vehicle controls.

FIG. 16 depicts a system in which the user's hand and/or finger(s) is displayed using AR or VR to show the user where his or her hand and/or finger is located relative to the vehicle controls. The AR/VR finger representation 55 and the AR/VR hand representation 58 may be partially transparent show the vehicle controls behind the finger/hand. The AR/VR finger and hand representations 55, 58 may be visually enhanced, e.g. colored, highlighted, etc. to indicate when the finger or hand is aligned with a vehicle control and/or when the finger or hand is interacting with the vehicle control. For example, the finger or hand representation may be colored a first color when aligned with the vehicle control and then colored a second color different from the first color when the finger or hand is interacting with he vehicle command, i.e. when a user command is being received from the finger or hand.

Figure 17:
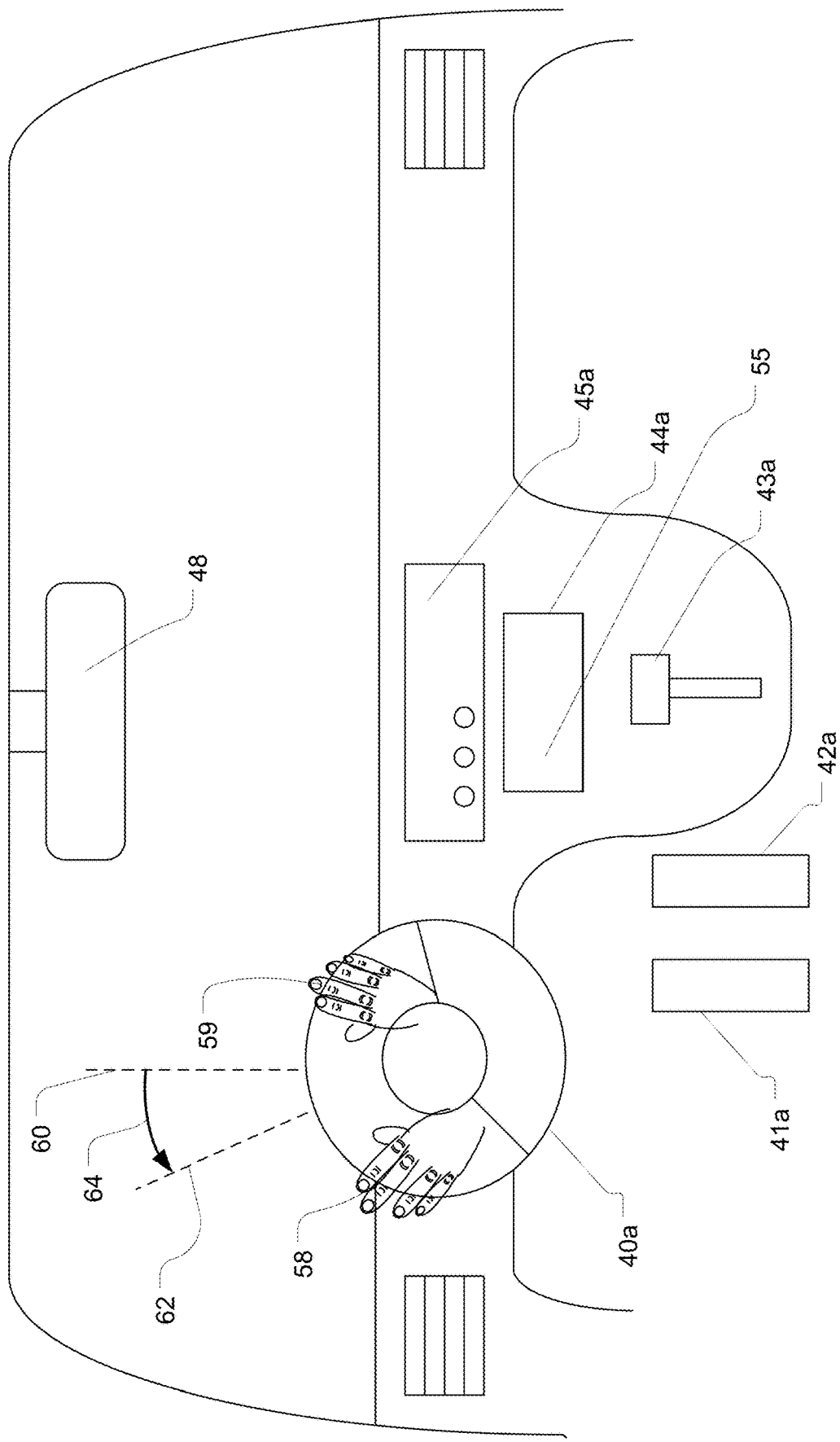
FIG. 17 depicts a system in which the user's hands are displayed using AR or VR on the steering wheel.

FIG. 17 depicts a system in which the user's hands are displayed using AR or VR on the steering wheel. In this example, the left and right hand representations 58, 59 are displayed relative to the steering wheel representation 40a. In this embodiment, the headset presents an AR steering guide as an AR overlay over the FPV imagery. The AR steering guide includes a straight-direction indicator 60 and a current steering direction indicator 62. A steering wheel angular displacement indicator 64 (the curved arrow) shows the amount of angle that the steering wheel is being turned. The indicators 62, 64 provide visual guides to the remote user to facilitate the task of steering the vehicle.

Figure 18:
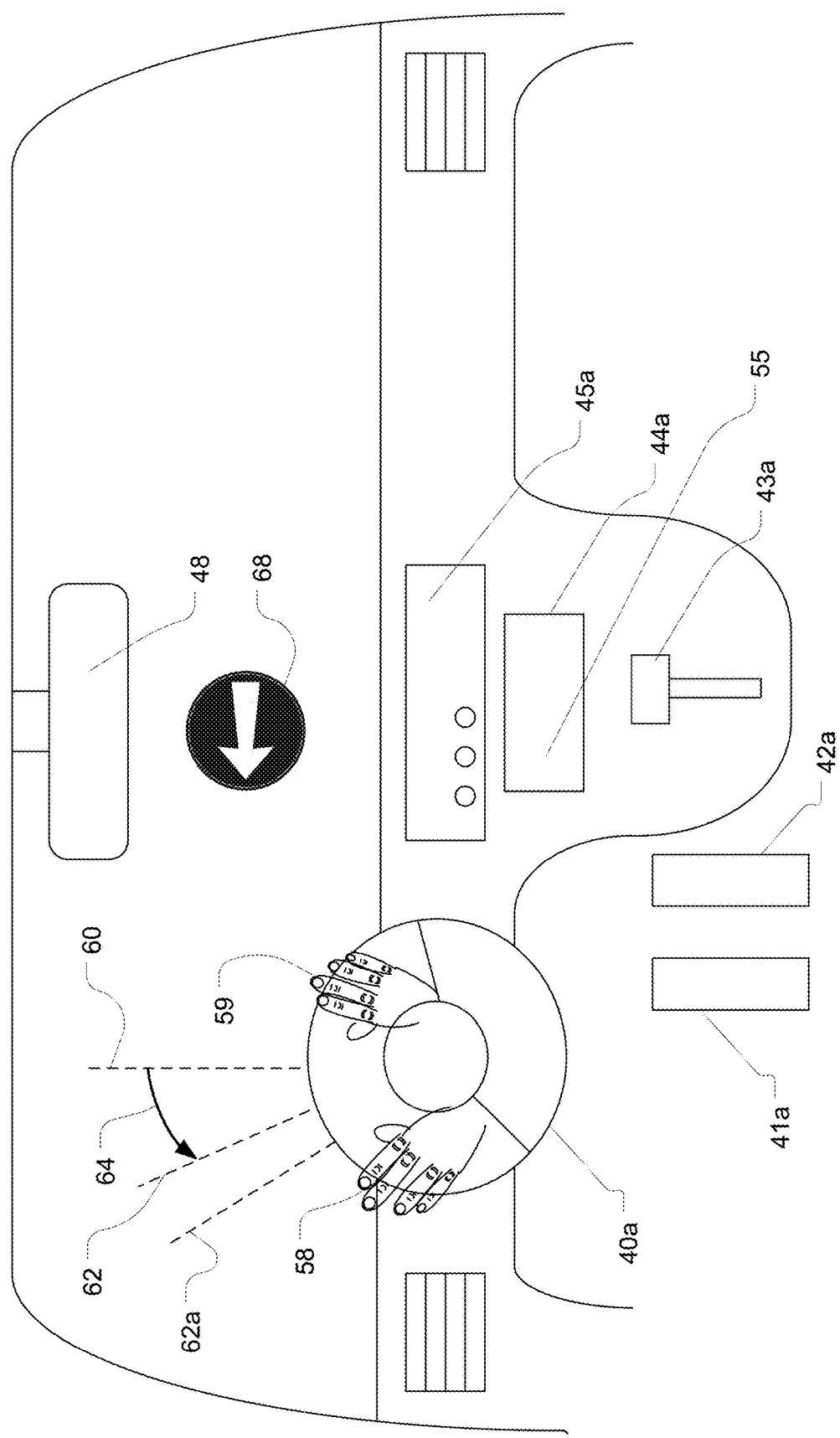
FIG. 18 depicts a system in which the user's hands are displayed using AR or VR on the steering wheel and the display further shows a turning angle to remain within the self-driving envelope.

FIG. 18 depicts a system in which the user's hands (e.g. left and right hand representations 58, 59) are displayed using AR or VR relative to the steering wheel representation 40a and in which the display of the headset further shows a target turning angle/direction, e.g. to follow the road and remain within the self-driving envelope. The headset presents to the remote user the desired or target steering direction/angle 62a relative to the straight ahead direction that the remote user should turn the steering wheel using the remote control device to effect a safe or optimal turn of the vehicle based on the curvature of the road and the safe driving envelope. Specifically, the headset in this example presents a straight-direction indicator 60 indicative of the straight-ahead reference plane, a current steering direction indicator 62 indicative of the current steering direction, and a target steering direction indicator 62a indicative the desired, target steering input needed to steer the vehicle in the optimal direction. The steering wheel angular displacement indicator 64 (the curved arrow) as noted above shows the amount of angle that the steering wheel is being turned. The indicators 60, 62, 62a, 64 thus visually guide the remote user to effect the desired steering input. In one embodiment, the target steering direction indicator is variable in time and space so that it changes as the turn is being made, depending on the curvature of the road, the presence of obstacles, e.g. pedestrians and other vehicles, and the user input most recently provided. The remote user can thus continually adjust the steering input to attempt to turn the vehicle. In one embodiment, the indicators may appear and disappear selectively in response to user commands or automatically in response to marginal steering performance from the remote user. In one embodiment, the vehicle displays the indicators to correct marginal steering performance and, if the steering performance worsens or does not improve beyond a threshold, the vehicle automatically switches to autonomous driving mode.

Also depicted in FIG. 18 is an AR traffic sign 68 that may be displayed as a steering cue. Note that the steering cue may be different from AR road signs (i.e. real-world signs that are augmented based on actual road signs recognized by the object recognition or machine vision system of the vehicle). The steering cues are provided by the headset to prompt the remote user to effect the desired steering input at the desired time. If the steering input is not received within a predetermined interval of time, the vehicle may automatically switch to autonomous driving mode. In other words, if the remote user fails to provide remote control input within a predetermined time or if the user input is not within prescribed safe operating parameters, the vehicle automatically switches or defaults as a failsafe to autonomous driving mode. The steering cues may be supplemented or replaced by a line or multiple lines delineating the path to be taken by the remote user.

Figure 19:
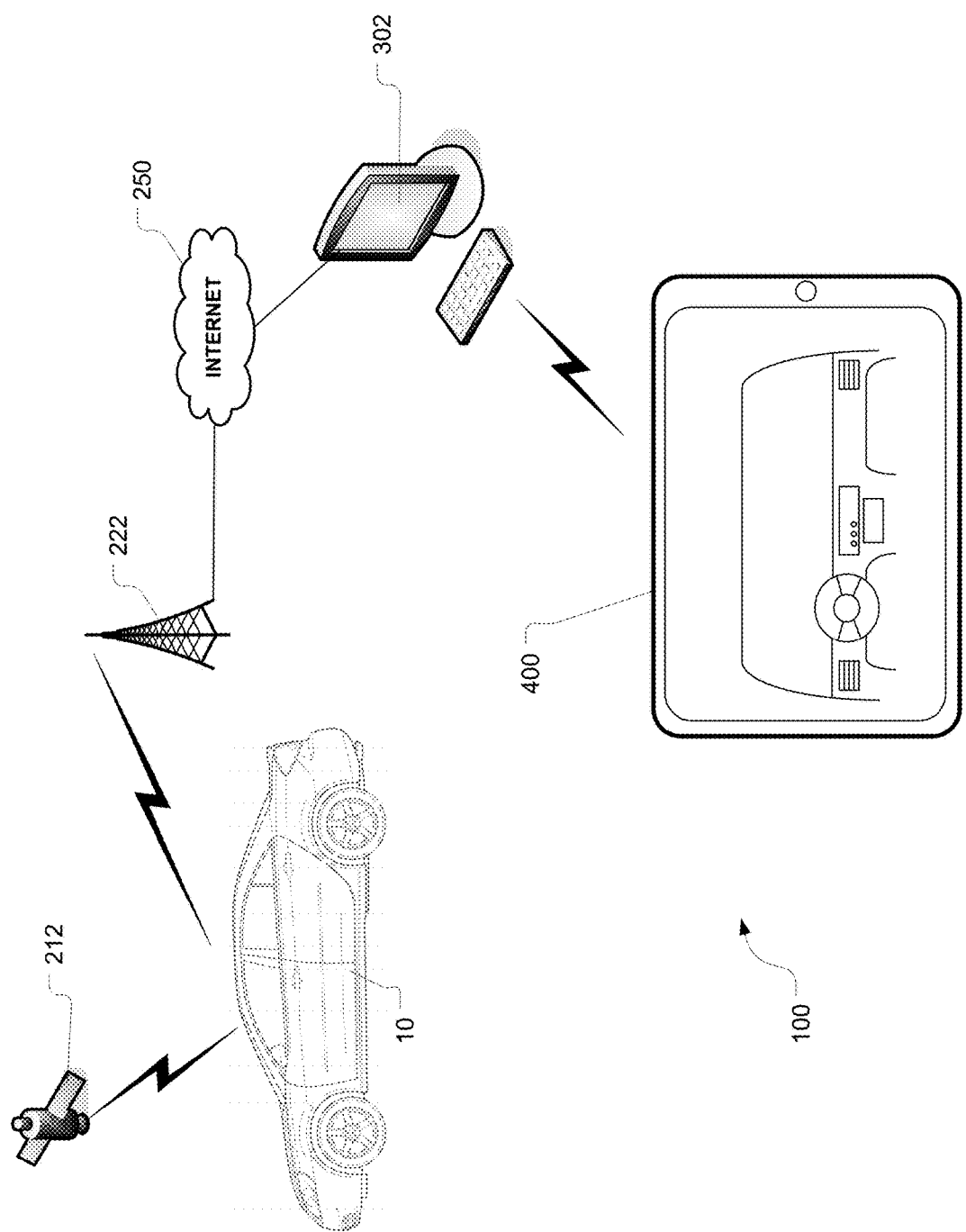
FIG. 19 is a schematic depiction of a self-driving vehicle system having a handheld mobile communication device for remotely supervising and partially controlling the vehicle in accordance with an embodiment of the present invention.

In another embodiment of the system 100 which is depicted in FIG. 19, the remotely situated vehicle control device 300 is a handheld mobile communication device 400. The handheld mobile communication device 400 may be a smart phone, cell phone, tablet (as illustrated) or any other such computing device. The handheld mobile communication device 400 may be wirelessly connected to the internet-connected computing device 302 as shown. Alternatively, the internet-connected computing device 302 may be used as the control device in another embodiment.

Figure 20:
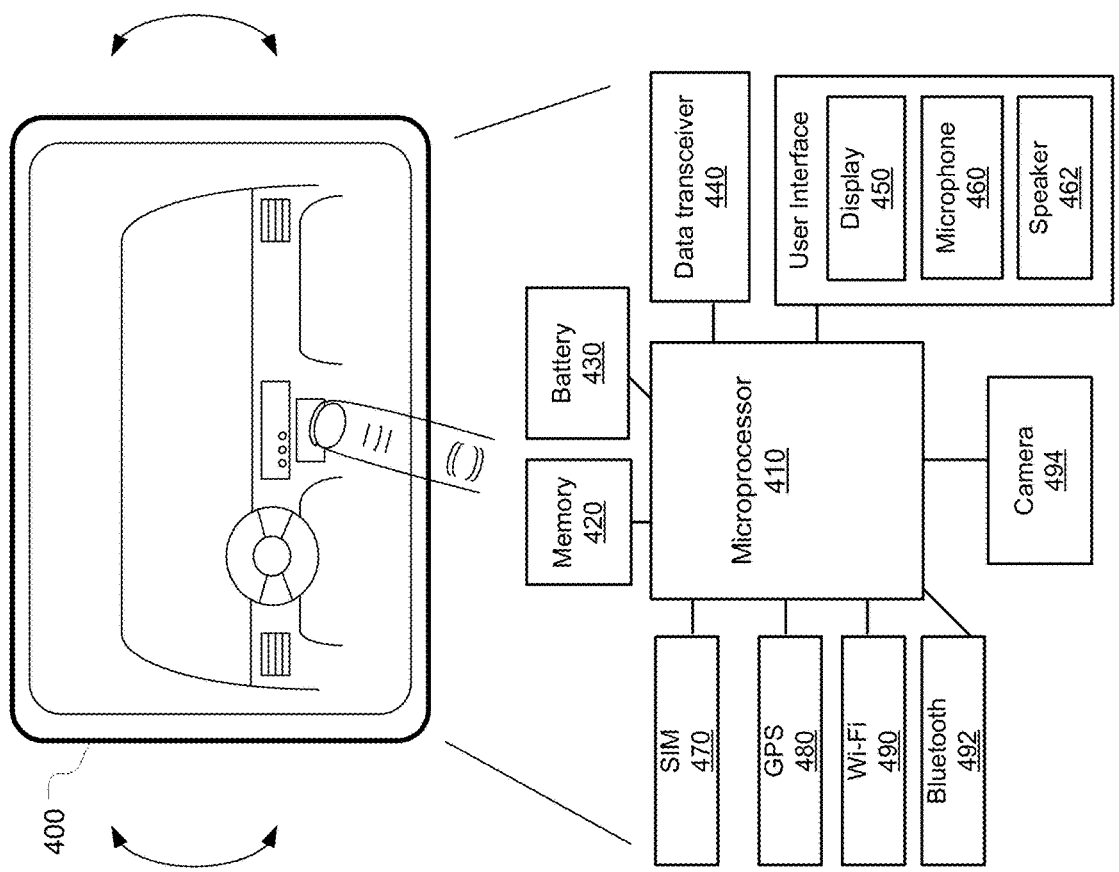
FIG. 20 is a schematic depiction of some of the primary components of the handheld mobile communication device.

In the embodiment depicted by way of example in FIG. 20, the handheld mobile communication device 400 includes a processor 410, a memory 420, a battery 430, and a data transceiver 440. The handheld mobile communication device 400 has a user interface including a display (e.g. a touch screen display) 450, a microphone 460, a speaker 462 and/or an earphone jack. Optionally, the device may include a speech-recognition subsystem for transforming voice input in the form of sound waves into an electrical signal. The electrical signal is then processed by a speech-recognition module (digital signal processor) to determine voice commands from the voice input. The user may thus use voice commands to control elements of the vehicle. For example, the user may issue a voice command to turn on the headlights. The handheld mobile communication device 400 may include a subscriber identity module (SIM) card 470, a GPS receiver 480, a Wi-Fi™ transceiver 490 or any other equivalent short-range wireless transceiver for communicating with a Wi-Fi router or hotspot. For example, the mobile device 100 may optionally include a transceiver for WiMax™ (IEEE 802.16), a transceiver for ZigBee® (IEEE 802.15.4-2003 or other wireless personal area networks), an infrared transceiver or an ultra-wideband transceiver. The handheld mobile communication device 400 may include a Bluetooth® transceiver 492 for pairing with another Bluetooth® device or transceiver. The handheld mobile communication 400 may include a near-field communications (NFC) chip. The NFC chip may be part of an NFC reader and/or operate in conjunction with NFC processing software on the device capable of processing data read from an NFC tag. NFC is a short-range wireless technology that operates typically over a distance of 10 cm or less. Operating at a frequency of 13.56 MHz, NFC transmits at data rates of 106 kbit/s to 424 kbit/s. The NFC reader (initiator) irradiates a tag (passive target that does not require batteries) by actively generating an RF field that powers the tag. The mobile handheld communication device 400 may also include a camera 494.

Figure 21:
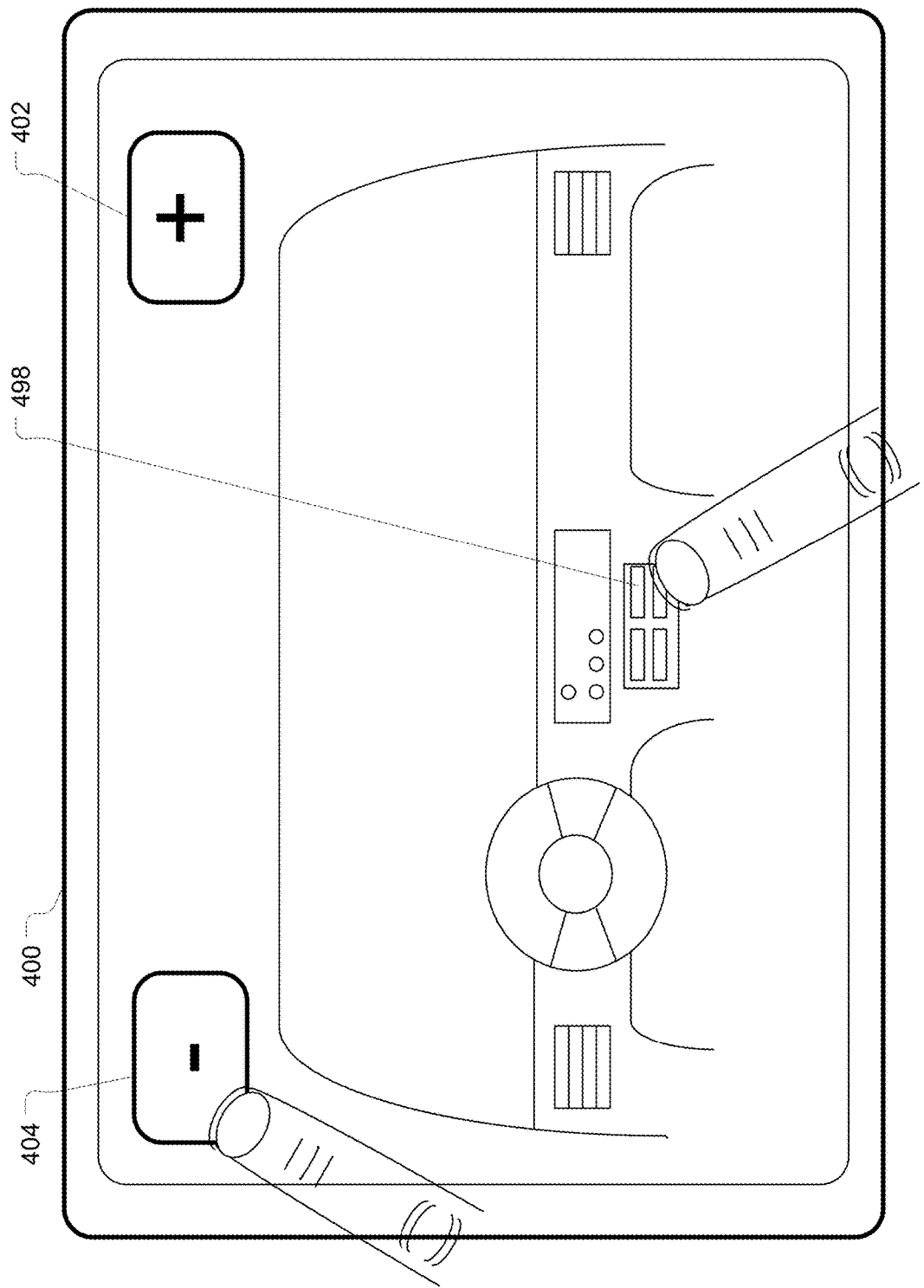
FIG. 21 illustrates how the user can remotely control functions of the vehicle by providing touch input on a representation of the dashboard displayed on the handheld mobile communication device.

In one embodiment, the handheld mobile communication device 400 is configured to display the FPV images and is further configured to receive accelerometer input representing a steering input from the user and to generate and transmit the supplemental vehicle control input representing the steering input to the self-driving vehicle. For example, the handheld mobile communication device may be rotated left and right to provide steering input (as shown by the curved arrows in FIG. 20). Acceleration and braking may be performed by interacting, e.g. touching, user interface elements 402, 404, 498 displayed on the touch-screen display of the handheld mobile communication device as shown by way of example in FIG. 21. In the embodiment depicted in FIG. 21, the user interface element 402 is a touch-sensitive button to increase the velocity of the vehicle whereas the user interface element 404 is a touch-sensitive button to decrease the velocity of the vehicle. The user interface element 498 is a touch-sensitive button to activate a dashboard function of the vehicle such as a control element of an audio system, climate control, etc.

The handheld mobile communication device 400 may be configured to accept user input to enlarge (zoom in) or shrink (zoom out) the display of the user interface elements 498. The handheld mobile communication device 400 may be configured to display a realistic representation of the dashboard and vehicle controls to thus display every single vehicle control. In a variant, the handheld mobile communication device 400 may be configured to display a simplified or modified representation of the dashboard and vehicle controls.

Figure 22:
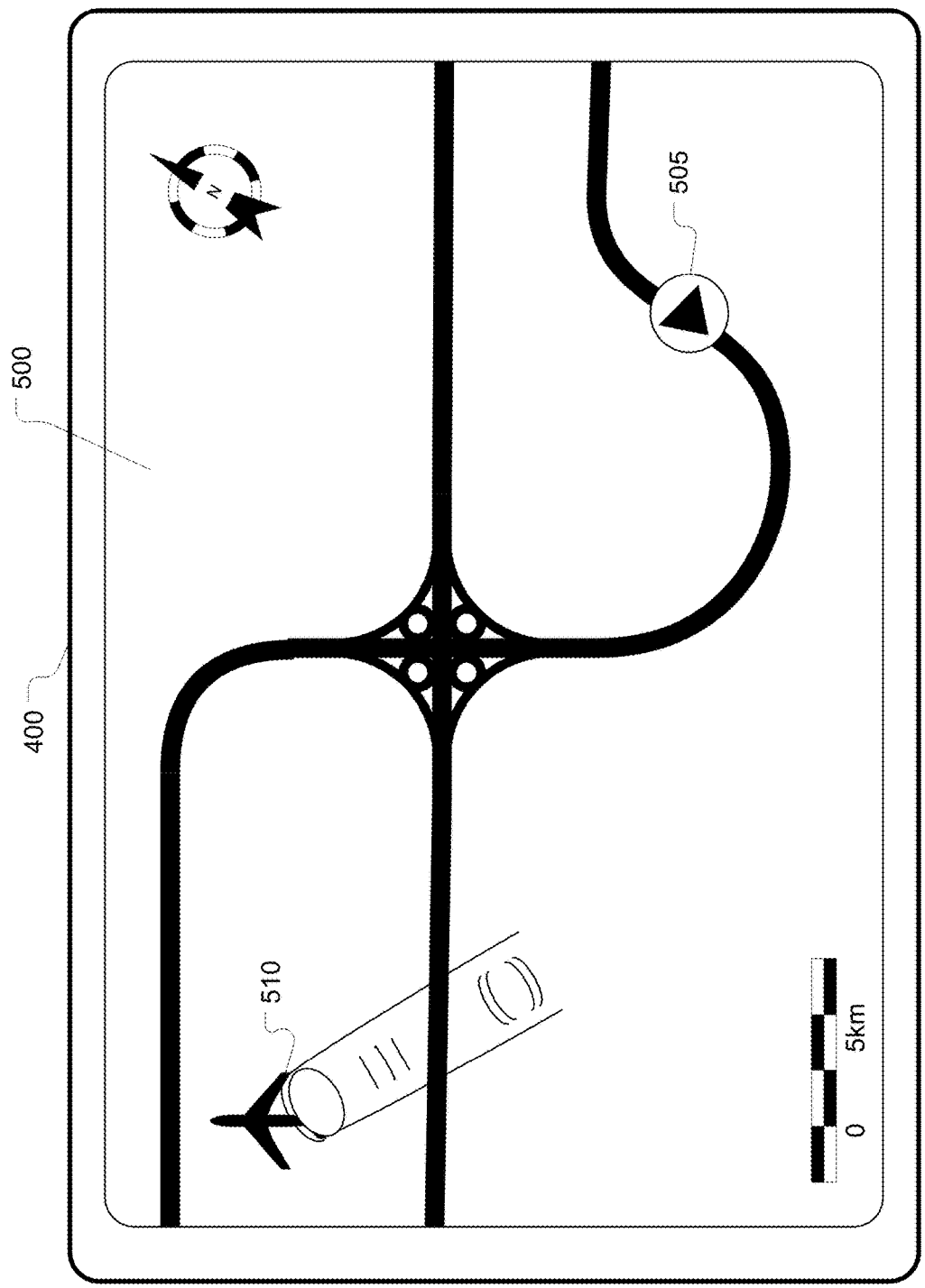
FIG. 22 illustrates how the user can touch a destination on a map of the handheld mobile communication device to direct the vehicle to drive autonomously to the destination/

In one embodiment, which is depicted by way of example in FIG. 22, the vehicle is controlled by touching a destination 510 on a map 500 displayed on a touch-screen display 450 of the handheld mobile communication device 400. Data representing the destination is then transmitted wirelessly (i.e. over the air) by a cellular data link to the vehicle which inputs automatically the destination data representing the destination into the navigation system, automatically computes the route from the current position 505, and then automatically begins to drive autonomously form the current position 505 to the selected destination 510. Once at the destination, the vehicle may be programmed to autonomously park, idle, loiter (i.e. keep driving around in the area, circling the block) and/or to transmit a request to the user for further instructions on arrival at the destination or after a predetermined amount of time after having arrived at the destination. Alternatively, the vehicle may transmit the request for further instructions a predetermined time or predetermined distance before arriving at the destination so as to give the remote user time to provide further directions, instructions or commands to the vehicle.

Figure 23:
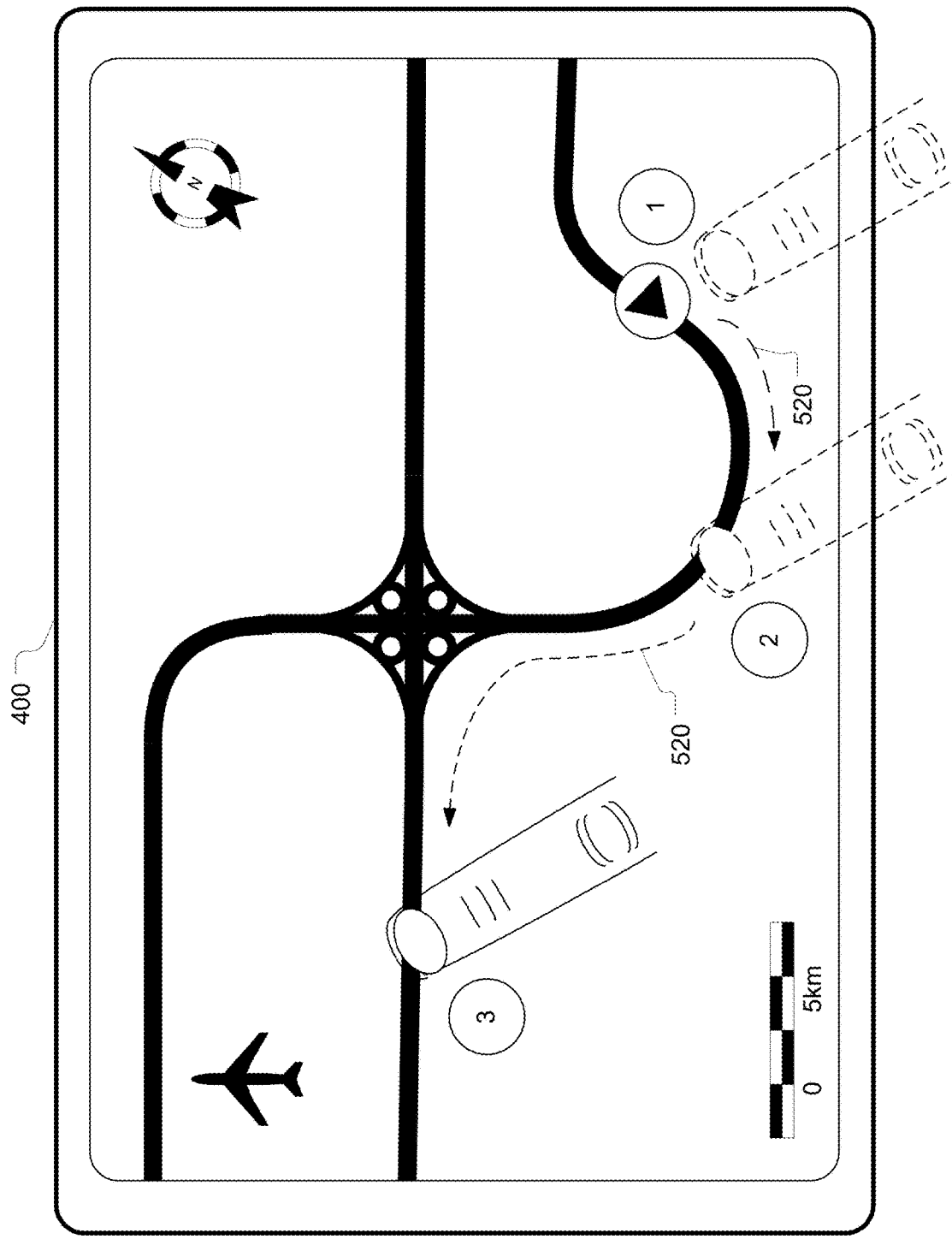
FIG. 23 illustrates how the user can trace a route on a map of the handheld mobile communication device to direct the vehicle to drive autonomously along the route.

In another embodiment, as depicted in FIG. 23, the vehicle at the current position 505 is controlled by drawing or tracing a route 520 on the map 500 displayed on a touch-screen display 450 of the handheld mobile communication device 400. In one embodiment, the handheld mobile communication device 400 automatically pans or zooms out when the route being drawn reaches an edge of the map. Tracing out a route 520 on the map 500 dictates the route to take by the vehicle from the current position 505 toward each of the successive waypoints selected by the user. The traced route may be the complete route to the destination or just a segment (partial segment) of the way toward an ultimate destination. As noted above, prior to arrival at the end of the segment, the vehicle may be configured or programmed to transmit a query to the user for further directions.

In one embodiment, the processor in the vehicle is configured to compare the supplemental vehicle control input to a safe driving envelope (SDE) and to permit the supplemental vehicle control input to control the vehicle only if the supplemental vehicle control input is within the safe driving envelope. For example, the safe driving envelope (SDE)

may specify a maximum speed or a range of acceptable speeds. The maximum speed may be the speed limit for a given roadway or it may be a percentage or fraction of the speed limit for the given roadway. For example, the user may be permitted by the SDE to drive 75% of the speed limit for the given roadway. The SDE may specify a maximum acceleration and a maximum deceleration when braking. The SDE may specify a maximum g-force (acceleration) when turning a corner. The SDE may specify a maximum lateral deviation relative to the detected edges of the roadway. The SDE may driving parameters that are road-specific, time-specific, location-specific, or weather-specific. For example, the SDE may specify that the vehicle must avoid certain types of places, points of interest, landmarks, geofences, etc. For example, the SDE may specify that the vehicle is not to travel through a certain part of the city at night, or that the vehicle is not to drive past a school, or that the vehicle is not to use a highway, or to stray more than a certain distance from the user, from a service station, gas station, supercharger, etc.

Figure 24:
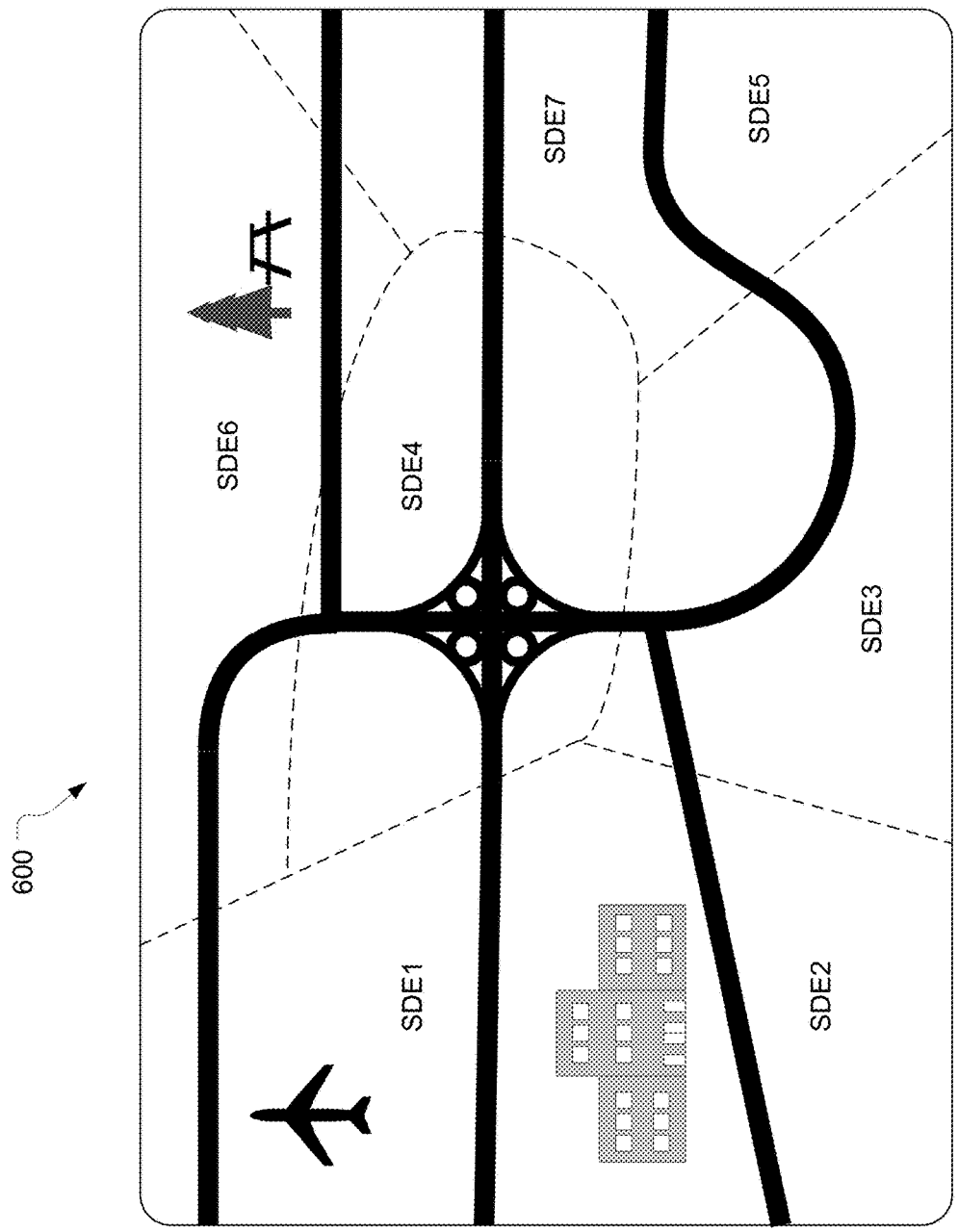
FIG. 24 depicts a map segmented into different zones with which is associated a respective safe driving envelope.

In one embodiment, as illustrated by way of example in FIG. 24, the safe driving envelope is one of a plurality of safe driving envelopes stored in a memory communicatively connected to the processor of the vehicle, wherein each safe driving envelope comprises both time-dependent and location-dependent driving parameters. A new SDE may be transmitted to the vehicle over the air. An existing SDE, whether being used or merely stored, may be modified over the air by sending updated SDE data to the vehicle. FIG. 24 depicts a region 600 of a map divided into seven distinct non-overlapping self-driving envelopes SDE1, SDE2, SDE3, SDE4, SDE5, SDE6 and SDE7. In another embodiment, the self-driving envelopes may be partially overlapping such that the conditions from two or more self-driving envelopes are used to control driving parameters in overlapped areas.

In at least one embodiment, the processor implements a safe driving envelope that limits the steering, speed, and direction of the vehicle to keep the vehicle within safe operating parameters. This safe driving envelope may limit the speed of the vehicle to within prescribed speed limits, e.g. based on the location of the vehicle. The safe driving envelope may limit where the vehicle goes, e.g. to keep the vehicle on the road and not on a sidewalk or off the road. The safe driving envelope may overrule remote drive inputs that might result in an accident or collision. In at least one embodiment, the safe driving envelope can be variable, e.g. based on location, time, vehicle type, weather conditions, visibility, time of day, light conditions (day vs. night). In at least one embodiment, there may be a plurality of geofenced envelopes each defined by location coordinates forming respective geofences. Once the vehicle enters a geofenced area, the vehicle sets the safe driving envelope corresponding to the geofenced area. The geofenced areas and the respective driving parameters may be user defined, owner defined, defined by third parties, e.g. government authorities or insurers, etc. In one embodiment, the SDE is transmitted to the vehicle in response to entering a geographical area. In a variant, the SDE is transmitted to the vehicle as a prerequisite for entering the geographical area. For example, the vehicle may be required to download and use a city-specific SDE as a prerequisite for entering the city limits. For instance, the city of New York may require that any autonomous vehicle seeking to enter the city must download the latest SDE for the city to ensure that it respects all driving requirements for autonomous vehicles operating in the city.

In some embodiments, the self-driving envelope(s) may be correlated to the different types of views available such that selecting or activating a particular view causes a given SDE to be activated. For example, a pure VR view may be associated with a first SDE, a pure FPV view may be associated with a second SDE, and an AR/FPV view may be associated with a third SDE. Each of the composite views such as those of FIGS. 12-15, for example, may each be associated with a different SDE.

In one implementation, the system utilizes a hierarchical paradigm of self-driving envelopes with master SDE's that provide general parameters, specific SDE's within each master SDE, and then sub-SDE's within each specific SDE. For example, a first master SDE may provide parameters for highway driving and a second master SDE may provide parameters for urban/city driving. Specific SDE's for each master SDE can provide, for example, parameters for daytime driving and night-time driving. Sub-SDE's may be provided for specific weather conditions, times of days, traffic congestion/densities, etc.

In at least some embodiments, the self-driving envelope(s) may be communicated in data packets over the air (wirelessly) to the vehicle. In at least one embodiment, the vehicle may be configured to receive an override command from a law enforcement authority to permit the law enforcement authority to take control of the vehicle. In another embodiment, the law enforcement authority may transmit or broadcast an envelope to one or more vehicles, e.g. to deal with a local emergency situation, such as a car accident, fire, crime, etc.

In one embodiment, the processor is configured to detect a malfunction and to transmit an alert to the remotely situated vehicle control device to request supplemental vehicle control input. The malfunction may be a sensor malfunction. The malfunction may be a processor malfunction. The malfunction may be a software error or a malware detection event. The malfunction may be a mechanical or electrical vehicle malfunction or failure. Some examples of mechanical or electrical malfunctions are an engine problem, excess oil temperature, flat tire, etc. The vehicle may also alert the user of other issues such as a near-empty gas tank, low battery, low tire pressure, or maintenance reminder.

In one embodiment, the processor in the vehicle executes an authenticator module configured to receive authentication data from the remotely situated vehicle control device, to validate the authentication data and to permit the supplemental vehicle control input to control the vehicle only if the authentication data is validated. In one embodiment, the authenticator module is configured to recognize a law enforcement intercept message from a law enforcement agent device and to permit the supplemental vehicle control input from the law enforcement agent device to control the vehicle. In one embodiment, the authentication process may be triggered when the remote user logs into the computing device 302 to begin supervision and control of the vehicle. In one implementation, the remote user enters user credentials (e.g. user name and password) and may also provide other authentication information such as biometric input and a cryptographic token. Once the remote user is authenticated, the system may allow the user to select the vehicle to be controlled and may load the self-driving envelopes associated with the remote user and the selected vehicle.

In one embodiment, the device processor is configured to receive a handover command from the user of the remotely situated vehicle control device, to process the handover command to identify a takeover user who is to take over remote control of the vehicle, to cooperate with the transceiver to hand over control of the vehicle to the takeover user.

In one embodiment, the processor in the vehicle implements a vehicle control algorithm that modulates the supplemental vehicle control input data to amplify or attenuate the supplemental vehicle control input data based on a user control factor (UCF). The UCF determines the degree to which the vehicle is autonomous and, conversely, the degree to which it is being remotely controlled.

In one implementation, the user control factor is automatically varied by the processor based on time and/or location. For example, the user control factor (UCF) may be varied depending on the time of day. For instance, the UCF for night time driving may be different from the UCF for daytime driving. In another implementation, the user control factor (UCF) is further automatically varied by the processor based on one or more of the traffic, accident reports and weather. For example, if the traffic is dense and congested, the UCF may be decreased to allow less user control. If the traffic is flowing normally and traffic density is low, the UCF may be increased to allow more user control. If there are accident reports in the vicinity of the vehicle, the UCF may be modified automatically. The UCF may be decreased if there is a traffic accident reported in the vicinity of the vehicle. In a variant, the UCF is decreased if the accident is along a projected route or in a direction in which the vehicle is currently heading. Real-time weather data may be used to vary or modify the UCF in real-time. If bad weather is expected or commencing, such as rain, snow, freezing rain, fog, etc., the UCF can be adjusted. In most cases, bad weather results in the UCF being decreased to lessen user control; however, in some exceptional cases, the UCF may be increased due to bad weather, e.g. in situations where the sensors are considered to be significantly impaired to the point that the remote user is better able to guide the vehicle.

In one embodiment, each driver has a unique UCF that is indicative of the skill of the driver. The UCF may be exported as a data file for insurers or for providing real-time insurance coverage, leasing costs, rental costs that are based on the user's risk of operating the vehicle.

For training purposes, the system may be adapted to permit a teacher and a student to simultaneously and jointly control a single vehicle. The input from the student and the input from the teacher are both received by the processor of the vehicle. In one mode, the teacher's commands override the student's commands. In another mode, the teachers commands and the student's commands are mixed, combined or blended to provide a combined input value that is weighted according to one or more weighting coefficients that may be teacher-specified, configured by a third party or pre-programmed by the system.

For some driving operations, such as long-distance trucking, passenger buses, agricultural vehicles, etc. that may operate throughout the night, it may be desirable to implement a twin operator paradigm requiring input from two remote operators. The input from the two remote operators may be mixed, blended or combined to provide a single input value for the vehicle. This provides redundancy to ensure that one operator cannot either intentionally or accidentally provide undesirable input to the vehicle or in case one operator falls asleep while supervising the progress of the remote vehicle.

In another implementation, the self-driving vehicle system provides dynamically changing freedom or permissiveness in controlling the vehicle based on the measured skill of the remote driver. In this implementation, the user control factor is automatically varied by the processor based on a feedback signal from a user-scoring module that dynamically scores a driving skill of the user by comparing the supplemental vehicle control input data to expected driving parameters. If the user exhibits a high level of skill in the remotely driving the vehicle by providing steering, acceleration and braking inputs that are within the expected driving parameters, the system may dynamically grant the remote user more leeway in controlling the vehicle. Conversely, if the user exhibits a low level of skill in the remotely driving the vehicle by providing steering, acceleration and braking inputs that outside of the expected driving parameters, the system may dynamically curtail the remote user's leeway in controlling the vehicle. Thus, the system may control the extent to which it enables the remote user to control the vehicle based on how well the remote user is actually controlling the vehicle.

The foregoing methods can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps.

These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including" and "having" are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A self-driving vehicle system comprising:
a self-driving vehicle;
a remotely situated vehicle control device in data communication with the self-driving vehicle and operable by a user situated outside of the vehicle;
wherein the self-driving vehicle comprises:
a vehicle chassis;
a motor supported by the chassis for providing propulsive power for the vehicle;
a braking system;
a steering system;
a plurality of sensors;
a processor configured to receive signals from the sensors and to generate steering, acceleration and braking control signals for controlling the steering system, the motor and the braking system of the vehicle;
a Global Navigation Satellite System (GNSS) receiver for receiving satellite signals and for determining a current location of the self-driving vehicle;
a radiofrequency data transceiver; and
a first-person view (FPV) camera for generating FPV images that are transmitted as FPV data in real-time via the radiofrequency data transceiver to the remotely situated vehicle control device, wherein the processor is further configured to receive supplemental vehicle control input from the remotely situated vehicle control device, and wherein the processor is further configured to modify the steering, acceleration and braking control signals based on the supplemental vehicle control input;
wherein the remotely situated vehicle control device comprises:
a device data transceiver for receiving the FPV data;
a device processor for processing the FPV data and for regenerating the FPV images;
a device display cooperating with the device processor to display the FPV images while also displaying virtual reality or augmented reality representations of vehicle controls to enable the user to control the vehicle by interacting with the virtual reality or augmented reality representations of the vehicle controls;
a user input device configured to receive the supplemental vehicle control input to interact with the virtual reality or augmented reality representations of the vehicle controls, wherein the device processor is configured to generate supplemental vehicle control input data and to cooperate with the device data transceiver to transmit the supplemental vehicle control input data to the self-driving vehicle to modify the steering, acceleration and braking control signals.

2. The self-driving vehicle system of claim 1 wherein the remotely situated vehicle control device is a virtual reality headset wherein the device display is a virtual reality display presenting virtual reality imagery, wherein the virtual reality headset provides the virtual reality or augmented reality representations of the vehicle controls while displaying the FPV images to enable the user of the virtual reality headset to control the vehicle by interacting with the virtual reality or augmented reality representations of the vehicle controls, wherein the virtual reality headset comprises a three-axis head tracker module to enable the user to control pan, tilt, and roll of the FPV camera in the vehicle.

3. The self-driving vehicle system of claim 2 wherein the virtual reality headset provides virtual reality or augmented reality representations of the hands, fingers or thumbs of the user interacting with the vehicle controls, wherein the virtual reality or augmented reality representations of the hands, fingers or thumbs portray the hands, fingers or thumbs of the user as being partially transparent to show the vehicle controls behind the hands, fingers or thumbs.

4. The self-driving vehicle system of claim 3 wherein the virtual reality or augmented reality representation of the vehicle controls includes a virtual reality or augmented reality representation of a steering wheel and wherein the virtual reality headset displays an augmented reality steering guide as an augmented reality overlay over the FPV imagery, wherein the augmented reality steering guide includes one or more of: a straight-direction indicator, a current steering direction indicator, a steering wheel angular displacement indicator and a target steering direction/angle.

5. The self-driving vehicle system of claim 3 wherein the virtual reality or augmented reality representations of the hands, fingers or thumbs are visually enhanced to indicate when one of the hands, fingers or thumbs is aligned and/or interacts with one of the virtual reality or augmented reality representations of the vehicle controls.

6. The self-driving vehicle system of claim 1 wherein the processor in the vehicle is configured to compare the supplemental vehicle control input to a safe driving envelope limiting one or more of steering, acceleration and speed of the vehicle and to permit the supplemental vehicle control input to control the vehicle only if the supplemental vehicle control input is within the safe driving envelope, wherein the safe driving envelope is one of a plurality of safe driving envelopes stored in a memory communicatively connected to the processor of the vehicle, wherein each safe driving envelope comprises both time-dependent and location-dependent driving parameters.

7. The self-driving vehicle system of claim 1 wherein the processor is configured to detect a malfunction of the vehicle and to transmit an alert to the remotely situated vehicle control device to notify the user of the malfunction of the vehicle and to request supplemental vehicle control input.

8. The self-driving vehicle system of claim 1 further comprising a trunk-mounted camera, video display and speaker for videotelephony with a person loading an object into the trunk of the vehicle.

9. The self-driving vehicle system of claim 8 wherein the vehicle transmits a signal containing a code from a purchase receipt for the object upon arrival at a store to identify an order to be delivered to the vehicle and wherein the vehicle also transmits vehicle identification information to the store and wherein the vehicle comprises a trunk-mounted code reader comprising one or more of NFC chip reader, RFID reader, QR code scanner or bar code scanner for identifying the object being loaded into the trunk.

10. The self-driving vehicle system of claim 8 wherein the vehicle comprises a machine vision subsystem that includes the camera for optically identifying the object from one or more images captured by the trunk-mounted camera, wherein the machine vision subsystem also receives image data from a website showing a visual representation of the object that has been ordered or purchased for correlation with the one or more images captured by the camera.

11. The self-driving vehicle system of claim 8 wherein the vehicle, upon detecting that the object is a correct object to be purchased, sends a confirmation request to the user to confirm a purchase of the object by providing user input via the remotely situated vehicle control device.

12. The self-driving vehicle system of claim 1 wherein the processor modulates the supplemental vehicle control input data to amplify or attenuate the supplemental vehicle control input data based on a user control factor (UCF), wherein the UCF determines a degree to which the vehicle is autonomous or the degree to which the vehicle is being remotely controlled, wherein the UCF is automatically varied by the processor based on a feedback signal from a user-scoring module that dynamically scores a driving skill of the user by comparing the supplemental vehicle control input data to expected driving parameters.

13. The self-driving vehicle system of claim 12 wherein the UCF is based on time of day such that the UCF for nighttime is different than the UCF for daytime.

14. A self-driving vehicle system comprising:
a self-driving vehicle;
a remotely situated vehicle control device in data communication with the self-driving vehicle and operable by a user situated outside of the vehicle;
wherein the self-driving vehicle comprises:
a vehicle chassis;
a motor supported by the chassis for providing propulsive power for the vehicle;
a braking system;
a steering system;
a plurality of sensors;
a processor configured to receive signals from the sensors and to generate steering, acceleration and braking control signals for controlling the steering system, the motor and the braking system of the vehicle;
a Global Navigation Satellite System (GNSS) receiver for receiving satellite signals and for determining a current location of the self-driving vehicle;
a radiofrequency data transceiver; and
a first-person view (FPV) camera for generating FPV images that are transmitted as FPV data in real-time via the radiofrequency data transceiver to the remotely situated vehicle control device, wherein the processor is further configured to receive supplemental vehicle control input from the remotely situated vehicle control device, and wherein the processor is further configured to modify the steering, acceleration and braking control signals based on the supplemental vehicle control input;
wherein the remotely situated vehicle control device comprises:
a device data transceiver for receiving the FPV data;
a device processor for processing the FPV data and for generating augmented-reality FPV images;
a device display cooperating with the device processor to display the augmented-reality FPV images, wherein the augmented-reality FPV images include an augmented reality steering guide as an augmented reality overlay over the FPV images, wherein the augmented reality steering guide includes a target steering direction/angle to remain within a safe driving envelope;
a user input device configured to receive the supplemental vehicle control input, wherein the device processor is configured to generate supplemental vehicle control input data and to cooperate with the device data transceiver to transmit the supplemental vehicle control input data to the self-driving vehicle to modify the steering, acceleration and braking control signals while keeping the vehicle within the safe driving envelope.

15. The self-driving vehicle system of claim 14 wherein the augmented reality steering guide also includes one or both of a current steering direction indicator and a steering wheel angular displacement indicator.

16. The self-driving vehicle system of claim 14 wherein the vehicle stores a plurality of safe driving envelopes and selects the safe driving envelope from the plurality of safe driving envelopes based on whether the device display is displaying an augmented reality FPV view or a virtual reality view or a composite view composed of both augmented reality FPV and virtual reality views.

17. A self-driving vehicle system comprising:
a self-driving vehicle;
a remotely situated vehicle control device in data communication with the self-driving vehicle and operable by a user situated outside of the vehicle;
wherein the self-driving vehicle comprises:
a vehicle chassis;
a motor supported by the chassis for providing propulsive power for the vehicle;
a braking system;
a steering system;
a plurality of sensors;
a processor configured to receive signals from the sensors and to generate steering, acceleration and braking control signals for controlling the steering system, the motor and the braking system of the vehicle;
a Global Navigation Satellite System (GNSS) receiver for receiving satellite signals and for determining a current location of the self-driving vehicle;
a radiofrequency data transceiver; and
a first-person view (FPV) camera for generating FPV images that are transmitted as FPV data in real-time via the radiofrequency data transceiver to the remotely situated vehicle control device, wherein the processor is further configured to receive supplemental vehicle control input from the remotely situated vehicle control device, and wherein the processor is further configured to modify the steering, acceleration and braking control signals based on the supplemental vehicle control input;
wherein the remotely situated vehicle control device comprises:
a device data transceiver for receiving the FPV data;
a device processor for processing the FPV data and for regenerating the FPV images;
a hybrid image headset worn by the user and cooperating with the device processor to display a composite image that is divided into two or more of a virtual reality view, a pure FPV view and an augmented reality FPV view;
a user input device configured to receive the supplemental vehicle control input, wherein the device processor is configured to generate supplemental vehicle control input data and to cooperate with the device data transceiver to transmit the supplemental vehicle control input data to the self-driving vehicle to modify the steering, acceleration and braking control signals.

18. The self-driving vehicle system of claim 17 wherein the hybrid image headset comprises a three-axis head tracker module to enable the user who is wearing the hybrid image headset to control pan, tilt, and roll of the FPV camera in the vehicle based on motion of the headset.

19. The self-driving vehicle system of claim 17 wherein the hybrid image headset provides actual real-time sound and noise captured by one or more microphones inside a cabin of the vehicle, wherein the hybrid image headset is configured to receive user input to suppress or enhance any one or more of different types or sources of noise.

20. The self-driving vehicle system of claim 17 wherein the hybrid image headset visually highlights the vehicle controls that are currently user-controllable.

* * * * *